(12) United States Patent
Hagiwara

(10) Patent No.: US 7,876,330 B2
(45) Date of Patent: Jan. 25, 2011

(54) COLOR CONVERSION APPARATUS, FILTER PROCESSING APPARATUS AND COLOR CONVERSION METHOD

(75) Inventor: Takahiro Hagiwara, Chiba-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 970 days.

(21) Appl. No.: 11/694,555

(22) Filed: Mar. 30, 2007

(65) Prior Publication Data

US 2008/0239403 A1 Oct. 2, 2008

(51) Int. Cl.
- G09G 5/02 (2006.01)
- G09G 5/00 (2006.01)
- G06T 1/00 (2006.01)
- G06F 3/08 (2006.01)
- G06K 15/00 (2006.01)
- H04N 1/46 (2006.01)
- H04N 1/60 (2006.01)

(52) U.S. Cl. .......... 345/589; 345/591; 345/600; 345/606; 345/428; 348/253; 348/557; 348/254; 358/3.23; 358/518; 358/523; 358/525; 382/162; 382/167; 382/274; 382/300; 708/290; 708/650

(58) Field of Classification Search ......... 345/427–428, 345/581, 589–593, 600–601, 604–606; 348/223, 348/253, 254, 539, 557, 560, 674–675; 358/3.23, 358/2.1, 518–519, 523–525; 382/162–167, 382/254, 274, 276, 300; 708/204, 235

See application file for complete search history.

(56) References Cited

U.S. PATENT DOCUMENTS

| | | | |
|---|---|---|---|
| 2002/0008709 A1* | 1/2002 | Suzuki | 345/600 |
| 2002/0122207 A1* | 9/2002 | Klassen et al. | 358/2.1 |
| 2003/0081831 A1* | 5/2003 | Fukao et al. | 382/167 |
| 2005/0140997 A1* | 6/2005 | Shirasawa | 358/1.9 |
| 2005/0249408 A1* | 11/2005 | Haikin | 382/167 |
| 2006/0033970 A1* | 2/2006 | Haikin | 358/518 |
| 2006/0139668 A1* | 6/2006 | Nishikawa | 358/1.9 |
| 2006/0245016 A1* | 11/2006 | Fukao et al. | 358/518 |
| 2007/0183656 A1* | 8/2007 | Kuwahara et al. | 382/162 |
| 2008/0239402 A1* | 10/2008 | Suzuki | 358/3.23 |
| 2009/0323123 A1* | 12/2009 | Walton et al. | 358/3.23 |

FOREIGN PATENT DOCUMENTS

| | | |
|---|---|---|
| JP | 2004-129226 | 4/2004 |
| JP | 2004-341765 | 12/2004 |
| JP | 2005-065113 | 3/2005 |

* cited by examiner

Primary Examiner—Wesner Sajous
(74) Attorney, Agent, or Firm—Turocy & Watson, LLP

(57) ABSTRACT

A technique that can contribute to improvement of processing efficiency in performing image processing employing an SIMD command is provided.

20 Claims, 39 Drawing Sheets

THREE-DIMENSIONAL LUT

DIVIDED INTO EIGHT
($9^3$ POINTS)
or
DIVIDED INTO SIXTEEN
($17^3$ POINTS)
or
DIVIDED INTO THIRTY-TWO
($33^3$ POINTS)

CUBIC LATTICE

LATTICE POINT

CUBE
(EIGHT-POINT INTERPOLATION)

TRIANGULAR PRISM
(SIX-POINT INTERPOLATION)

TRIANGULAR PYRAMID
(FOUR-POINT INTERPOLATION)

(PATTERN 1)

(PATTERN 2)

(PATTERN 3)

(PATTERN 4)

(PATTERN 5)

(PATTERN 6)

$$D_C = C_{P0} + W1_C(C_{P1}-C_{P0}) + W2_C(C_{P7}-C_{P0}) + W3_C(C_{P5}-C_{P0})$$
$$D_M = M_{P0} + W1_M(M_{P1}-M_{P0}) + W2_M(M_{P7}-M_{P0}) + W3_M(M_{P5}-M_{P0})$$
$$D_Y = C_{P0} + W1_Y(Y_{P1}-Y_{P0}) + W2_Y(Y_{P7}-Y_{P0}) + W3_Y(Y_{P5}-Y_{P0})$$

STRUCTURE OF LUT VALUE (RGB→CMYK)

FIG.34

| | | | | | | | | | | | | | | | |
|---|---|---|---|---|---|---|---|---|---|---|---|---|---|---|---|
| PATTERN1 | 0 | 1 | 5 | 7 | 8 | 9 | 13 | 15 | 16 | 17 | 21 | 23 | 24 | 25 | 29 | 31 |
| PATTERN2 | 0 | 1 | 3 | 7 | 8 | 9 | 11 | 15 | 16 | 17 | 19 | 23 | 24 | 25 | 27 | 31 |
| PATTERN3 | 0 | 4 | 5 | 7 | 8 | 12 | 13 | 15 | 16 | 20 | 21 | 23 | 24 | 28 | 29 | 31 |
| PATTERN4 | 0 | 2 | 6 | 7 | 8 | 10 | 14 | 15 | 16 | 18 | 22 | 23 | 24 | 26 | 30 | 31 |
| PATTERN5 | 0 | 2 | 3 | 7 | 8 | 10 | 11 | 15 | 16 | 18 | 19 | 23 | 24 | 26 | 27 | 31 |
| PATTERN6 | 0 | 4 | 6 | 7 | 8 | 12 | 14 | 15 | 16 | 20 | 22 | 23 | 24 | 28 | 30 | 31 |

FILTER COEFFICIENT

IMAGE DATA

VALUE OF PIXEL
OF ATTENTION(D) = (
    K00*R00 + K10*R10 + K20*R20
    + K01*R01 + K11*R11 + K21*R21
    + K02*R02 + K12*R12 + K22*R22)
    ÷ CONSTANT

EQUATION

EXAMPLE OF SPACE FILTER PROCESSING BY SIMD PROCESSOR

FIG.43

|  | K02 | K12 | K22 | 0 |
|---|---|---|---|---|
| SIMD REGISTER K | × | × | × | × |
| SIMD REGISTER R | R02 | R12 | R22 | FREE |
|  | + | + | + | + |
| SIMD REGISTER SUM1 | K00 × R00 <br> + <br> K01 × R01 | K10 × R10 <br> + <br> K11 × R11 | K20 × R20 <br> + <br> K21 × R21 | 0 |
|  | ‖ | ‖ | ‖ | ‖ |
| SIMD REGISTER SUM1 | K00 × R00 <br> + <br> K01 × R01 <br> + <br> K02 × R02 | K10 × R10 <br> + <br> K11 × R11 <br> + <br> K12 × R12 | K20 × R20 <br> + <br> K21 × R21 <br> + <br> K22 × R22 | 0 |

FIG.44

| SIMD REGISTER SUM1 | K00 × R00 <br> + <br> K01 × R01 <br> + <br> K02 × R02 | K10 × R10 <br> + <br> K11 × R11 <br> + <br> K12 × R12 | K20 × R20 <br> + <br> K21 × R21 <br> + <br> K22 × R22 | 0 |
|---|---|---|---|---|

RESULT OF R11 →

| SIMD REGISTER SUM1 | K00 × R00 <br> + <br> K01 × R01 <br> + <br> K02 × R02 <br> + <br> K10 × R10 <br> + <br> K11 × R11 <br> + <br> K12 × R12 <br> + <br> K20 × R20 <br> + <br> K21 × R21 <br> + <br> K22 × R22 | 0 | 0 | 0 |
|---|---|---|---|---|

FIG..45
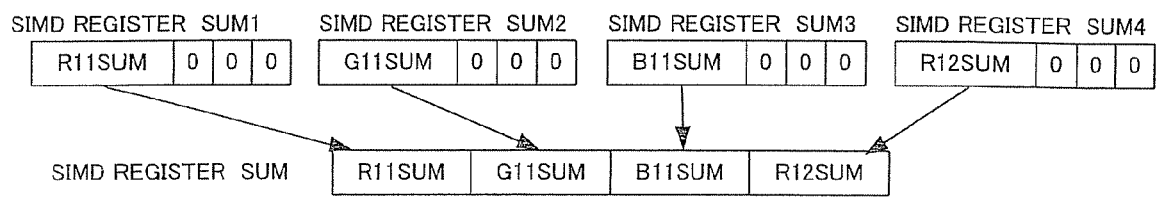
FIG.46
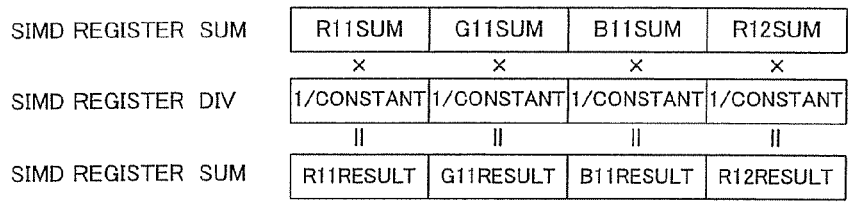

FIG.50

| SIMD REGISTER P3 | R20 | G20 | B20 | R30 | G30 | B30 | ... |
|---|---|---|---|---|---|---|---|
| | × | × | × | × | × | × | |
| SIMD REGISTER K3 | K20 | K20 | K20 | K20 | K20 | K20 | ... |
| | + | + | + | + | + | + | |
| SIMD REGISTER SUM | R00 × K00 + R10 × K10 | G00 × K00 + G10 × K10 | B00 × K00 + B10 × K10 | R10 × K00 + R20 × K10 | G10 × K00 + G20 × K10 | B10 × K00 + B20 × K10 | ... |
| | = | = | = | = | = | = | |
| SIMD REGISTER SUM | R00 × K00 + R10 × K10 + R20 × K20 | G00 × K00 + G10 × K10 + G20 × K20 | B00 × K00 + B10 × K10 + B20 × K20 | R10 × K00 + R20 × K10 + R30 × K20 | G10 × K00 + G20 × K10 + G30 × K20 | B10 × K00 + B20 × K10 + B30 × K20 | ... |

FIG.51

| SIMD REGISTER P4 | R01 | G01 | B01 | R11 | G11 | B11 | ⋮ |
|---|---|---|---|---|---|---|---|
| | × | × | × | × | × | × | |
| SIMD REGISTER K4 | K01 | K01 | K01 | K01 | K01 | K01 | ⋮ |
| | + | + | + | + | + | + | |
| SIMD REGISTER SUM | R00 × K00<br>R10 × K10<br>R20 × K20 | G00 × K00<br>G10 × K10<br>G20 × K20 | B00 × K00<br>B10 × K10<br>B20 × K20 | R10 × K00<br>R20 × K10<br>R30 × K20 | G10 × K00<br>G20 × K10<br>G30 × K20 | B10 × K00<br>B20 × K10<br>B30 × K20 | ⋮ |
| | = | = | = | = | = | = | |
| SIMD REGISTER SUM | R00 × K00<br>+ R10 × K10<br>+ R20 × K20<br>+ R01 × K01 | G00 × K00<br>+ G10 × K10<br>+ G20 × K20<br>+ G01 × K01 | B00 × K00<br>+ B10 × K10<br>+ B20 × K20<br>+ B01 × K01 | R10 × K00<br>+ R20 × K10<br>+ R30 × K20<br>+ R11 × K01 | G10 × K00<br>+ G20 × K10<br>+ G30 × K20<br>+ G11 × K01 | B10 × K00<br>+ B20 × K10<br>+ B30 × K20<br>+ B11 × K01 | ⋮ |

FIG.52

| SIMD REGISTER P9 | R22 | G22 | B22 | R32 | G32 | B32 | ... |
|---|---|---|---|---|---|---|---|
| | × | × | × | × | × | × | |
| SIMD REGISTER K9 | K22 | K22 | K22 | K22 | K22 | K22 | ... |
| | + | + | + | + | + | + | |
| SIMD REGISTER SUM | R00 × K00 <br> + <br> R10 × K10 <br> + <br> R20 × K20 <br> + <br> R01 × K01 <br> + <br> R11 × K11 <br> + <br> R21 × K12 <br> + <br> R02 × K02 <br> + <br> R12 × K12 | G00 × K00 <br> + <br> G10 × K10 <br> + <br> G20 × K20 <br> + <br> G01 × K01 <br> + <br> G11 × K11 <br> + <br> G21 × K12 <br> + <br> G02 × K02 <br> + <br> G12 × K12 | B00 × K00 <br> + <br> B10 × K10 <br> + <br> B20 × K20 <br> + <br> B01 × K01 <br> + <br> B11 × K11 <br> + <br> B21 × K12 <br> + <br> B02 × K02 <br> + <br> B12 × K12 | R10 × K00 <br> + <br> R20 × K10 <br> + <br> R30 × K20 <br> + <br> R11 × K01 <br> + <br> R21 × K11 <br> + <br> R31 × K12 <br> + <br> R12 × K02 <br> + <br> R22 × K12 | G10 × K00 <br> + <br> G20 × K10 <br> + <br> G30 × K20 <br> + <br> G11 × K01 <br> + <br> G21 × K11 <br> + <br> G31 × K12 <br> + <br> G12 × K02 <br> + <br> G22 × K12 | B10 × K00 <br> + <br> B20 × K10 <br> + <br> B30 × K20 <br> + <br> B11 × K01 <br> + <br> B21 × K11 <br> + <br> B31 × K12 <br> + <br> B12 × K02 <br> + <br> B22 × K12 | ... |
| | ‖ | ‖ | ‖ | ‖ | ‖ | ‖ | |
| SIMD REGISTER SUM | R00 × K00 <br> + <br> R10 × K10 <br> + <br> R20 × K20 <br> + <br> R01 × K01 <br> + <br> R11 × K11 <br> + <br> R21 × K12 <br> + <br> R02 × K02 <br> + <br> R12 × K12 <br> + <br> R22 × K22 | G00 × K00 <br> + <br> G10 × K10 <br> + <br> G20 × K20 <br> + <br> G01 × K01 <br> + <br> G11 × K11 <br> + <br> G21 × K12 <br> + <br> G02 × K02 <br> + <br> G12 × K12 <br> + <br> G22 × K22 | B00 × K00 <br> + <br> B10 × K10 <br> + <br> B20 × K20 <br> + <br> B01 × K01 <br> + <br> B11 × K11 <br> + <br> B21 × K12 <br> + <br> B02 × K02 <br> + <br> B12 × K12 <br> + <br> B22 × K22 | R10 × K00 <br> + <br> R20 × K10 <br> + <br> R30 × K20 <br> + <br> R11 × K01 <br> + <br> R21 × K11 <br> + <br> R31 × K12 <br> + <br> R12 × K02 <br> + <br> R22 × K12 <br> + <br> R32 × K22 | G10 × K00 <br> + <br> G20 × K10 <br> + <br> G30 × K20 <br> + <br> G11 × K01 <br> + <br> G21 × K11 <br> + <br> G31 × K12 <br> + <br> G12 × K02 <br> + <br> G22 × K12 <br> + <br> G32 × K22 | B10 × K00 <br> + <br> B20 × K10 <br> + <br> B30 × K20 <br> + <br> B11 × K01 <br> + <br> B21 × K11 <br> + <br> B31 × K12 <br> + <br> B12 × K02 <br> + <br> B22 × K12 <br> + <br> B32 × K22 | ... |

FIG.53

| | | | | | | | |
|---|---|---|---|---|---|---|---|
| SIMD REGISTER SUM | R00 × K00 + R10 × K10 + R20 × K20 + R01 × K01 + R11 × K11 + R21 × K12 + R02 × K02 + R12 × K12 + R22 × K22 | G00 × K00 + G10 × K10 + G20 × K20 + G01 × K01 + G11 × K11 + G21 × K12 + G02 × K02 + G12 × K12 + G22 × K22 | B00 × K00 + B10 × K10 + B20 × K20 + B01 × K01 + B11 × K11 + B21 × K12 + B02 × K02 + B12 × K12 + B22 × K22 | R10 × K00 + R20 × K10 + R30 × K20 + R11 × K01 + R21 × K11 + R31 × K12 + R12 × K02 + R22 × K12 + R32 × K22 | G10 × K00 + G20 × K10 + G30 × K20 + G11 × K01 + G21 × K11 + G31 × K12 + G12 × K02 + G22 × K12 + G32 × K22 | B10 × K00 + B20 × K10 + B30 × K20 + B11 × K01 + B21 × K11 + B31 × K12 + B12 × K02 + B22 × K12 + B32 × K22 | ... |
| | × | × | × | × | × | × | |
| SIMD REGISTER DIV | 1/CONSTANT | 1/CONSTANT | 1/CONSTANT | 1/CONSTANT | 1/CONSTANT | 1/CONSTANT | ... |
| | ‖ | ‖ | ‖ | ‖ | ‖ | ‖ | |
| SIMD REGISTER SUM | R11 RESULT | G11 RESULT | B11 RESULT | R12 RESULT | G12 RESULT | B12 RESULT | ... |

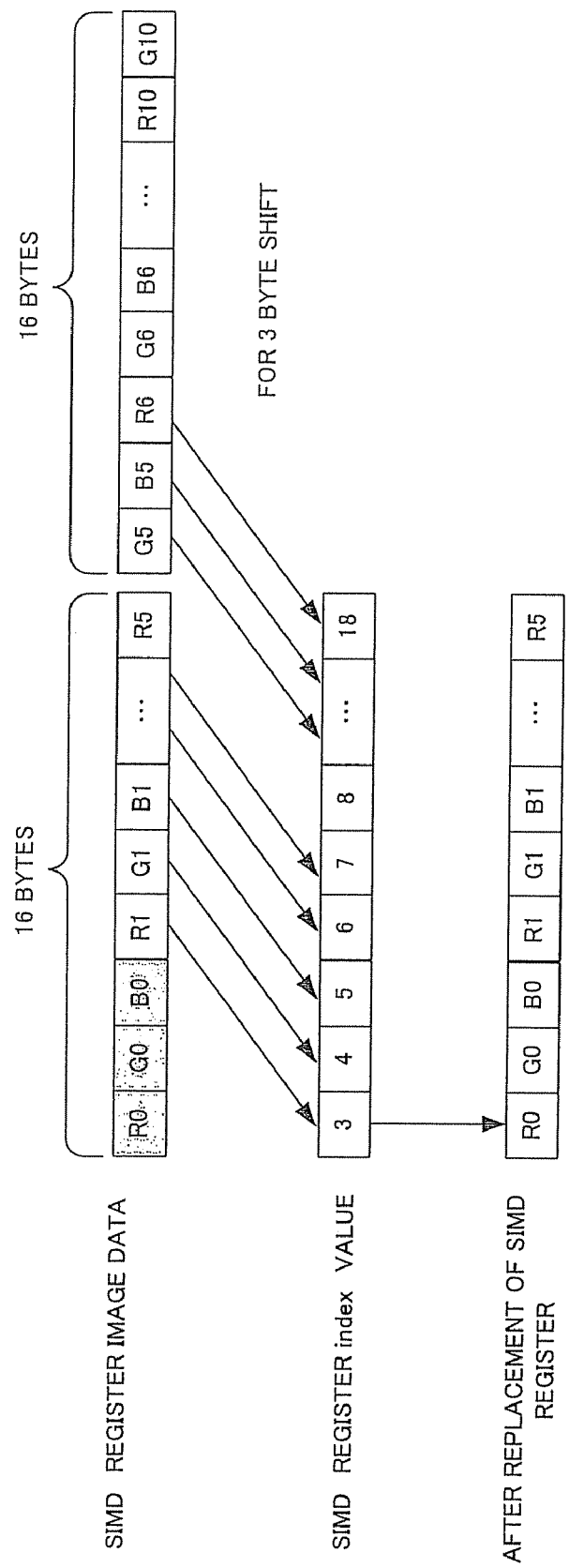

COLOR CONVERSION APPARATUS, FILTER PROCESSING APPARATUS AND COLOR CONVERSION METHOD

BACKGROUND OF THE INVENTION

1. Field of the Invention

The present invention relates to image processing employing a processor that is capable of executing an SIMD (Single Instruction Multiple Data) command, and, more particularly to improvement of processing efficiency in performing the image processing.

2. Description of the Related Art

In performing color conversion processing, there is a method of, when contents of the processing cannot be represented by a formula or when the contents can be represented by a formula but the formula is too complicated, associating a relation of input and output of the color conversion processing with an LUT (Look Up Table).

In general, input values in image processing are three variables represented by "R", "G", and "B". The numbers of gradations are often represented in 8 bits (256 values), respectively. When it is attempted to hold output values after the processing in a data table with respect to all values that such input values can take, this results in an enormous volume of data of the output values.

Therefore, a table interpolation method of reducing a table volume by combining interpolation processing for an output color space on the premise of continuity of a color change is used. The table interpolation method is a method of performing three-dimensional interpolation calculation using the number of near points of an output value corresponding to an arbitrary input value to obtain an output value. As this table interpolation method, an "eight-point interpolation method", a "four-point interpolation method", a "six-point interpolation method", and the like are known according to the number of near points used.

In recent years, multimedia apparatuses that input and output image data at high speed to perform image processing have been developed. A high-speed processing ability is demanded in order to realize color conversion processing in such multimedia apparatuses. In recent years, in order to make it possible to execute multimedia processing such as color conversion processing at high speed, a command called an SIMD (Single Instruction Multiple Data) command that can execute an integer arithmetic, a floating point arithmetic, and the like in parallel is implemented in a general-purpose processor. However, the SIMD command is good at executing plural kinds of arithmetic processing in parallel with one command but cannot execute, in parallel, memory random access processing for simultaneously referring to plural data of LUT data stored in a memory area.

For example, when interpolation processing according to the eight-point interpolation method is performed, it is necessary to read out color conversion values for eight points from an LUT for each color component of input values. Usually, it is necessary to perform memory Read processing twenty-four times (8×3=24). Therefore, even if it is possible to increase speed of the arithmetic processing such as the interpolation processing by performing the SIMD processing, it is impossible to increase speed of memory access processing at the time of LUT reference. Consequently, it is impossible to sufficiently reduce processing time for the entire color conversion processing regardless of the fact that the SIMD processing is used.

SUMMARY OF THE INVENTION

It is an object of an embodiment of the invention to provide a technique that can contribute to improvement of processing efficiency in performing image processing employing a processor that is capable of executing an SIMD command.

In order to solve the problems described above, a color conversion apparatus according to an aspect of the invention is a color conversion apparatus that converts, on the basis of a three-dimensional look up table that stores color conversion values associated with respective plural lattice points dividing a first color space represented by three kinds of color components into plural cubic lattices, a color value of a point belonging to the first color space into a color value of a point belonging to a second color space. The color conversion apparatus is characterized by including a color-value acquiring unit that acquires a color value of a point belonging to the first color space as an object of color conversion, a lattice discriminating unit that discriminates, on the basis of the color value acquired by the color-value acquiring unit, a cubic lattice on the first color space to which the point as an object of color conversion belongs, a polyhedron discriminating unit that discriminates, by performing comparison of the color value acquired by the color-value acquiring unit and a color value of a lattice point included in the cubic lattice discriminated by the lattice discriminating unit, to which one of plural polyhedrons the point as an object of color conversion belongs, the polyhedrons being obtained by dividing the cubic lattice, which is discriminated by the lattice discriminating unit, with a plane having plural lattice points included in the cubic lattice as vertices, and an interpolation operation unit that interpolates, on the basis of color conversion values associated with lattice points forming the polyhedron discriminated by the polyhedron discriminating unit, a color value of a point belonging to the second color space that corresponds to the color value of the point belonging to the first color space.

A filter processing apparatus according to another aspect of the invention is a filter processing apparatus that applies space filter processing to image data. The filter processing apparatus is characterized by including a color-component-value acquiring unit that acquires color component values of respective pixels forming image data as a processing object, a first data storing unit that stores color component values acquired by the color-component-value acquiring unit in a first register in an order same as an array of the color component values at the time when the color component values are acquired by the color-component-value acquiring unit, a second data storing unit that stores color component values acquired by the color-component-value acquiring unit in a second register in a state in which the color component values are shifted by a predetermined number of bits with respect to the color component values stored in the first register, a first multiplying unit that multiplies the respective color component values stored in the first register by a first filter coefficient according to an SIMD command, a second multiplying unit that multiplies the respective color component values stored in the second register by a second filter coefficient different from the first filter coefficient according to the SIMD command, and an adding unit that adds up results of the calculation by the first and the second multiplying units according to the SIMD command.

A color conversion method according to still another aspect of the invention is a color conversion method of converting, on the basis of a three-dimensional look up table that stores color conversion values associated with respective plural lattice points dividing a first color space represented by three kinds of color components into plural cubic lattices, a color value of a point belonging to the first color space into a color value of a point belonging to a second color space. The color conversion method is characterized by including a color-value acquiring step of acquiring a color value of a point belonging to the first color space as an object of color conversion, a lattice discriminating step of discriminating, on the basis of the color value acquired in the color-value acquiring step, a cubic lattice on the first color space to which the point as an object of color conversion belongs, a polyhedron discriminating step of discriminating, by performing comparison of the color value acquired in the color-value acquiring step and a color value of a lattice point included in the cubic lattice discriminated in the lattice discriminating step, to which one of plural polyhedrons the point as an object of color conversion belongs, the polyhedrons being obtained by dividing the cubic lattice, which is discriminated in the lattice discriminating step, with a plane having plural lattice points included in the cubic lattice as vertices, and an interpolation operation step of interpolating, on the basis of color conversion values associated with lattice points forming the polyhedron discriminated in the polyhedron discriminating step, a color value of a point belonging to the second color space that corresponds to the color value of the point belonging to the first color space.

A color conversion program according to still another aspect of the invention is a color conversion program for causing a computer to execute a color conversion method of converting, on the basis of a three-dimensional look up table that stores color conversion values associated with respective plural lattice points dividing a first color space represented by three kinds of color components into plural cubic lattices, a color value of a point belonging to the first color space into a color value of a point belonging to a second color space. The color conversion program is characterized by causing the computer to execute: a color-value acquiring step of acquiring a color value of a point belonging to the first color space as an object of color conversion, a lattice discriminating step of discriminating, on the basis of the color value acquired in the color-value acquiring step, a cubic lattice on the first color space to which the point as an object of color conversion belongs, a polyhedron discriminating step of discriminating, by performing comparison of the color value acquired in the color-value acquiring step and a color value of a lattice point included in the cubic lattice discriminated in the lattice discriminating step, to which one of plural polyhedrons the point as an object of color conversion belongs, the polyhedrons being obtained by dividing the cubic lattice, which is discriminated in the lattice discriminating step, with a plane having plural lattice points included in the cubic lattice as vertices, and an interpolation operation step of interpolating, on the basis of color conversion values associated with lattice points forming the polyhedron discriminated in the polyhedron discriminating step, a color value of a point belonging to the second color space that corresponds to the color value of the point belonging to the first color space.

A filter processing program according to still another aspect of the invention is a filter processing program for causing a computer to execute a filter processing method of applying space filter processing to image data. The filter processing program is characterized by causing the computer to execute: a color-component-value acquiring step of acquiring color component values of respective pixels forming image data as a processing object, a first data storing step of storing color component values acquired in the color-component-value acquiring step in a first register in an order same as an array of the color component values at the time when the color component values are acquired in the color-component-value acquiring step, a second data storing step of storing color component values acquired in the color-component-value acquiring step in a second register in a state in which the color component values are shifted by a predetermined number of bits with respect to the color component values stored in the first register, a first multiplying step of multiplying the respective color component values stored in the first register by a first filter coefficient according to an SIMD command, a second multiplying step of multiplying the respective color component values stored in the second register by a second filter coefficient different from the first filter coefficient according to the SIMD command, and an adding step of adding up results of the calculation in the first and the second multiplying steps according to the SIMD command.

DESCRIPTION OF THE DRAWINGS

FIG. 34 is a diagram showing an example of selection and extraction patterns (six patterns) used in the embodiment;

FIG. 43 is a diagram showing an example of the space filter processing by the SIMD processor;

FIG. 44 is a diagram showing an example of the space filter processing by the SIMD processor;

FIG. 45 is a diagram showing an example of the space filter processing by the SIMD processor;

FIG. 46 is a diagram showing an example of the space filter processing by the SIMD processor;

FIG. 50 is a diagram for explaining the outline of the filter processing in the embodiment;

FIG. 51 is a diagram for explaining the outline of the filter processing in the embodiment;

FIG. 52 is a diagram for explaining the outline of the filter processing in the embodiment;

FIG. 53 is a diagram for explaining the outline of the filter processing in the embodiment;

FIG. 54 is a diagram showing processing for copying data to a register according to a data replacement command;

DESCRIPTION OF THE EMBODIMENTS

Embodiments of the invention will be hereinafter explained with reference to the drawings.

First Embodiment

Figure 1:
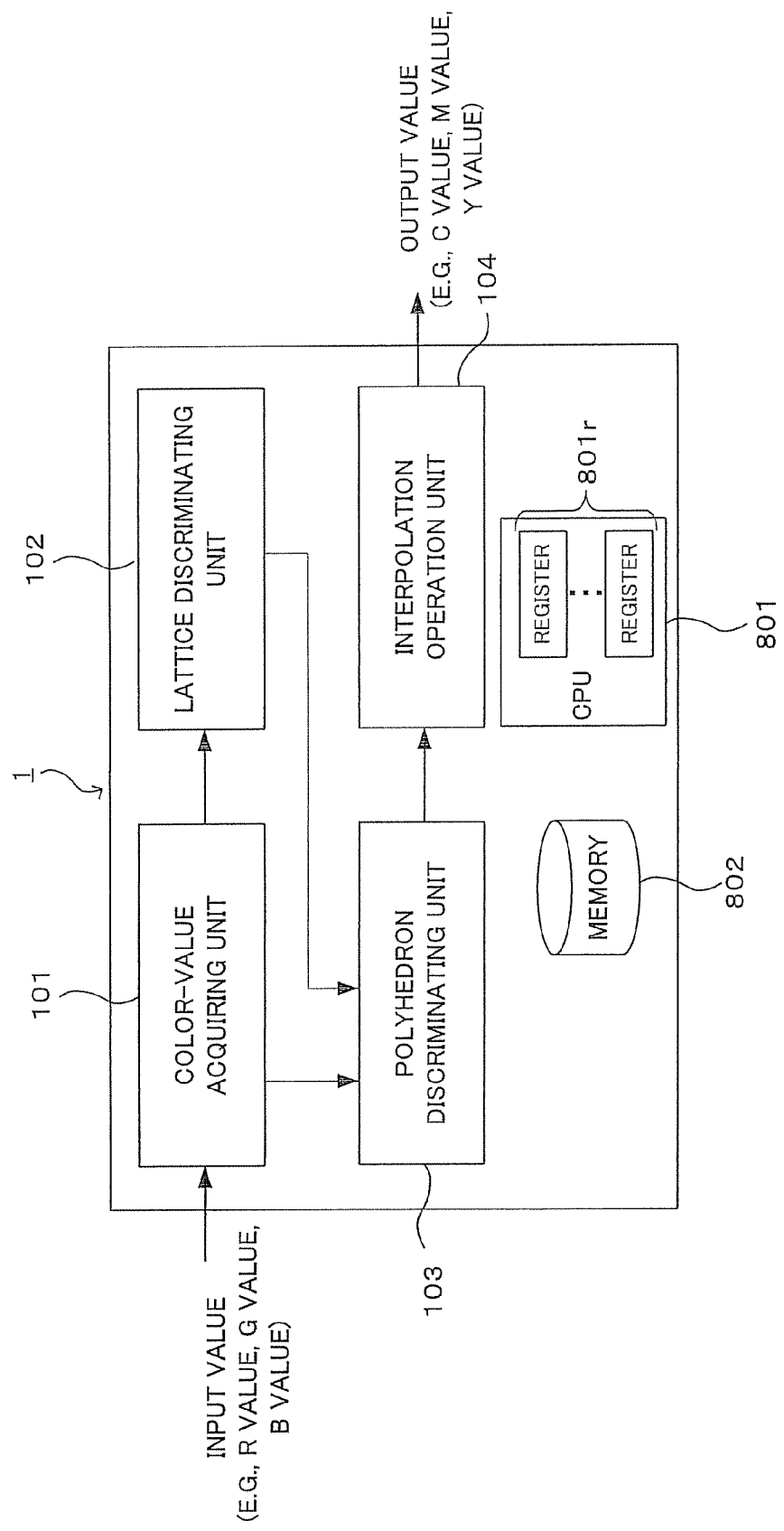
FIG. 1 is a functional block diagram for explaining a color conversion apparatus according to a first embodiment of the invention.

FIG. 1 is a functional block diagram for explaining a color conversion apparatus according to a first embodiment of the invention.

A color conversion apparatus 1 according to this embodiment includes a color-value acquiring unit 101, a lattice discriminating unit 102, a polyhedron discriminating unit 103, an interpolation operation unit 104, a CPU 801, and a MEMORY 802.

With the structure described above, the color conversion apparatus 1 according to this embodiment has a function of converting, on the basis of a three-dimensional look up table in which color conversion values associated with respective plural lattice points dividing a first color space represented by three kinds of color components into plural cubic lattices, a color value of a point belonging to the first color space into a color value of a point belonging to a second color space in which color representation different from that in the first color space is performed.

As the first and the second color spaces, for example, there are an RGB color space, a CMY color space, a CMYK color space, an Lab color space, an Luv color space, an Adobe (registered trademark) RGB color space, and an sRGB color space. In this embodiment, a case in which the first color space is the RGB color space and the second color space is the CMY color space will be explained as an example.

First, a rough structure of the color conversion apparatus according to this embodiment will be explained.

The color-value acquiring unit 101 acquires color values (a RED value, a GREEN value, and a BLUE value) of a point (a color represented by the RGB color space) belonging to the RGB color space which is an object of color conversion as an input value.

The lattice discriminating unit 102 discriminates, on the basis of the color value acquired by the color-value acquiring unit 101, a cubic lattice on the RGB color space to which the point as an object of color conversion belongs.

The polyhedron discriminating unit 103 discriminates to which one of plural polyhedrons obtained by dividing the cubic lattice, which is discriminated by the lattice discriminating unit 102, with a plane having plural lattice points included in the cubic lattice as vertices the point as an object of color conversion belongs by comparing, without using a conditional branch command, the color value acquired by the color-value acquiring unit 101 and a color value of a lattice point included in the cubic lattice discriminated by the lattice discriminating unit 102 according to a comparison operation command in an SIMD command.

Specifically, the polyhedron discriminating unit 103 acquires, on the basis of a result of the comparison operation, a "polyhedron identification number" indicating a polyhedron to which the point as an object of color conversion belongs among the plural polyhedrons obtained by dividing the cubic lattice by the plane having plural lattice points included in the cubic lattice discriminated by the lattice discriminating unit 102 as vertices according to a selection operation command in the SIMD command.

The interpolation operation unit 104 acquires, without using the conditional branch command, a color conversion value associated with a lattice point forming the polyhedron discriminated by the polyhedron discriminating unit 103 according to a selection command in the SIMD command and interpolates, on the basis of the color conversion value acquired, a color value (an output value) of a point belonging to the second color space that corresponds to the color value of the point belonging to the first color space.

Specifically, the interpolation operation unit 104 acquires, on the basis of the "polyhedron identification number" acquired by the polyhedron discriminating unit 103, a storage address of a color conversion value associated with the polyhedron corresponding to the polyhedron identification number according to an arithmetic operation and acquires a color conversion value stored in the storage address in the MEMORY 802 (a predetermined memory area). The "polyhedron identification number" here is set to a multiple of a basic unit size forming the three-dimensional look up table.

The CPU 801 has a role of performing various kinds of processing in the color conversion apparatus and also has a role of realizing various functions by executing programs stored in the MEMORY 802. The CPU 801 is a processor capable of executing the SIMD command and includes plural registers 801r used in executing the SIMD command and the like.

The MEMORY 802 is constituted by, for example, a ROM or a RAM and has a role of storing various kinds of information and programs used in the color conversion apparatus. Color conversion values of the three-dimensional look up table are stored in the MEMORY 802. Data of the three-dimensional look up table in this context is arrayed by a unit of register length (here, 16 bits) of the registers 801r used for the SIMD command and stored in the MEMORY 802.

Details of operations of the color conversion apparatus according to this embodiment will be explained.

Figure 2:
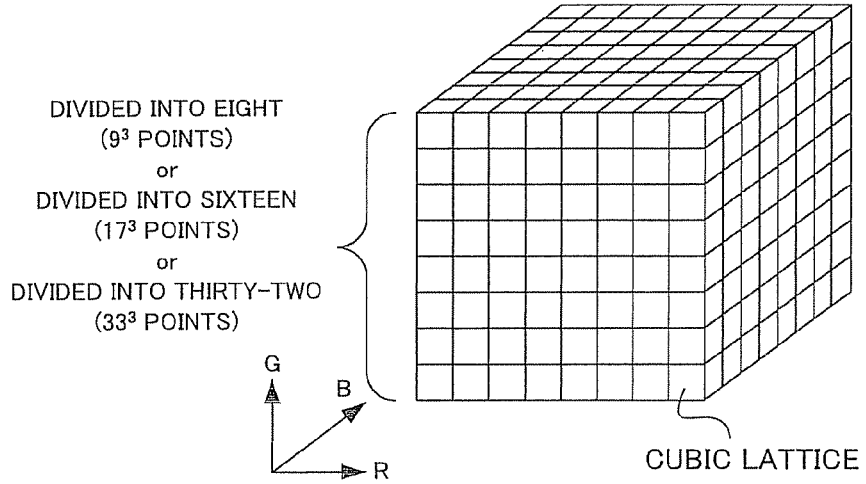
FIG. 2 is a diagram representing three color components in an RGB color space using a three-dimensional cube.

First, general color conversion processing employing a table interpolation method will be briefly explained. FIG. 2 is a diagram representing three color components in an RGB color space using a three-dimensional cube. Here, axes of an LUT correspond to an R value, a G value, and a B value, respectively, and values of the respective axes are divided into eight (divided by nine lattice points). Besides, respective axes representing levels of respective color component values can be divided into, for example, sixteen (divided by seventeen lattice points) or divided into thirty-two (divided by thirty-three lattice points). By dividing the first color space with plural lattice points in this way, it is possible to grasp that the first color space is imaginarily constituted by plural cubic lattice areas (in FIG. 2, 8×8×8 areas).

Figure 3:
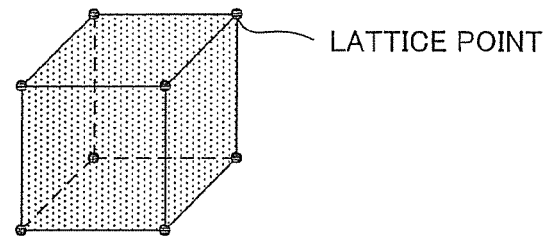
FIG. 3 is a diagram showing an example of a table interpolation method.
Figure 4:
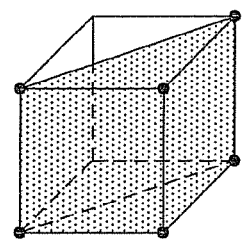
FIG. 4 is a diagram showing an example of the table interpolation method.
Figure 5:
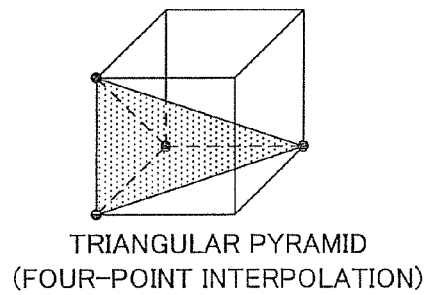
FIG. 5 is a diagram showing an example of the table interpolation method.
Figure 6:
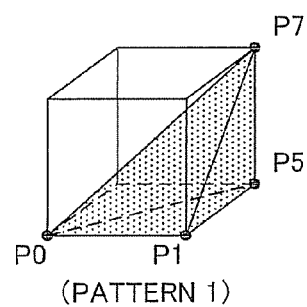
FIG. 6 is a diagram for explaining six kinds of triangular pyramid areas that divide a cubic lattice.
Figure 7:
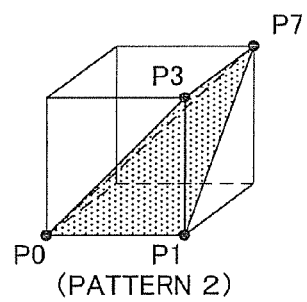
FIG. 7 is a diagram for explaining the six kinds of triangular pyramid areas that divide the cubic lattice.
Figure 8:
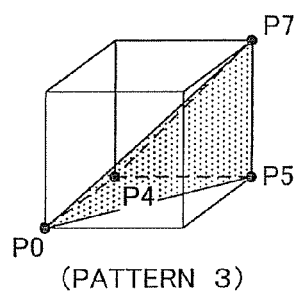
FIG. 8 is a diagram for explaining the six kinds of triangular pyramid areas that divide the cubic lattice.
Figure 9:
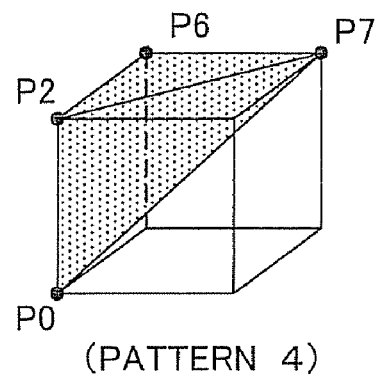
FIG. 9 is a diagram for explaining the six kinds of triangular pyramid areas that divide the cubic lattice.
Figure 10:
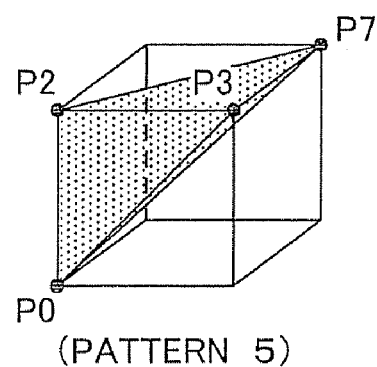
FIG. 10 is a diagram for explaining the six kinds of triangular pyramid areas that divide the cubic lattice.
Figure 11:
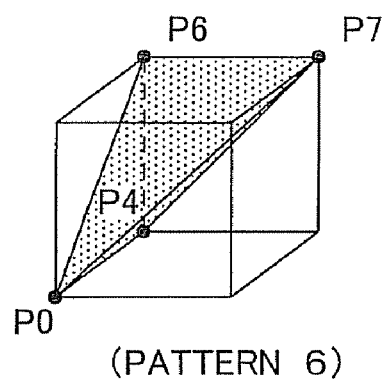
FIG. 11 is a diagram for explaining the six kinds of triangular pyramid areas that divide the cubic lattice.

FIGS. 3 to 5 are diagrams showing examples of the table interpolation method. As the table interpolation method, there are an "eight-point interpolation method" (see FIG. 3) of using color conversion values associated with eight lattice points forming all vertices of a cubic lattice, a "six-point interpolation method" (see FIG. 4) of dividing an area of a cubic lattice into two triangular prism areas and using color conversion values associated with six lattice points forming vertices of the respective triangular prism areas, a "four-point interpolation method) (see FIG. 5) of dividing an area of a cubic lattice into six triangular pyramid areas and using color conversion values associated with four lattice points forming vertices of the respective triangular pyramid areas, and the like. In the following description, this embodiment will be explained citing an example in which table interpolation employing the "four-point interpolation method" is performed.

First, each of an R value, a G value, and a B value as input values is divided into higher order 3 bits and lower order 5 bits. The lattice discriminating unit 102 reads out, using a value of the higher order 3 bits, a color conversion value as an object and a color conversion value stored in a memory address near the color conversion value from a three-dimensional LUT stored in the MEMORY 802 according to the number of color components of a color space of an output value.

In this embodiment, since the color space of the output value (the second color space) is the CMY color space, three LUTs, namely, conversion LUTs for a C value, an M value, and a Y value, which are color components of the CMY color space, are stored in the MEMORY 802. It goes without saying that, when there are four kinds as the number of color components when, for example, a color space of an output value is the CMYK color space, four kinds of conversion LUTs are prepared and, when there are seven kinds as the number of color components when, for example, a color space of an output value is a CMYRGBK color space, seven kinds of conversion LUTs are prepared.

The polyhedron discriminating unit 103 discriminates, using a value of the lower order 5 bits of the R value, the G value, and the B value as input values, to which area of six kinds of triangular pyramid areas (polyhedrons) shown in FIGS. 6 to 11 a color of the input value belongs. The polyhedron discriminating unit 103 reads out color conversion values for four lattice points from each of the four kinds of conversion LUTs stored in the MEMORY 802.

The interpolation operation unit 104 calculates an output value (a value after color conversion processing) according to a correction formula shown in Equation (1) on the basis of the color conversion values corresponding to the four lattice points read out as described above.

$$(D)=(P0)+W1((P1)-(P0))+W2((P2)-(P0))+W3((P3)-(P0)) \quad (1)$$

Figure 12:
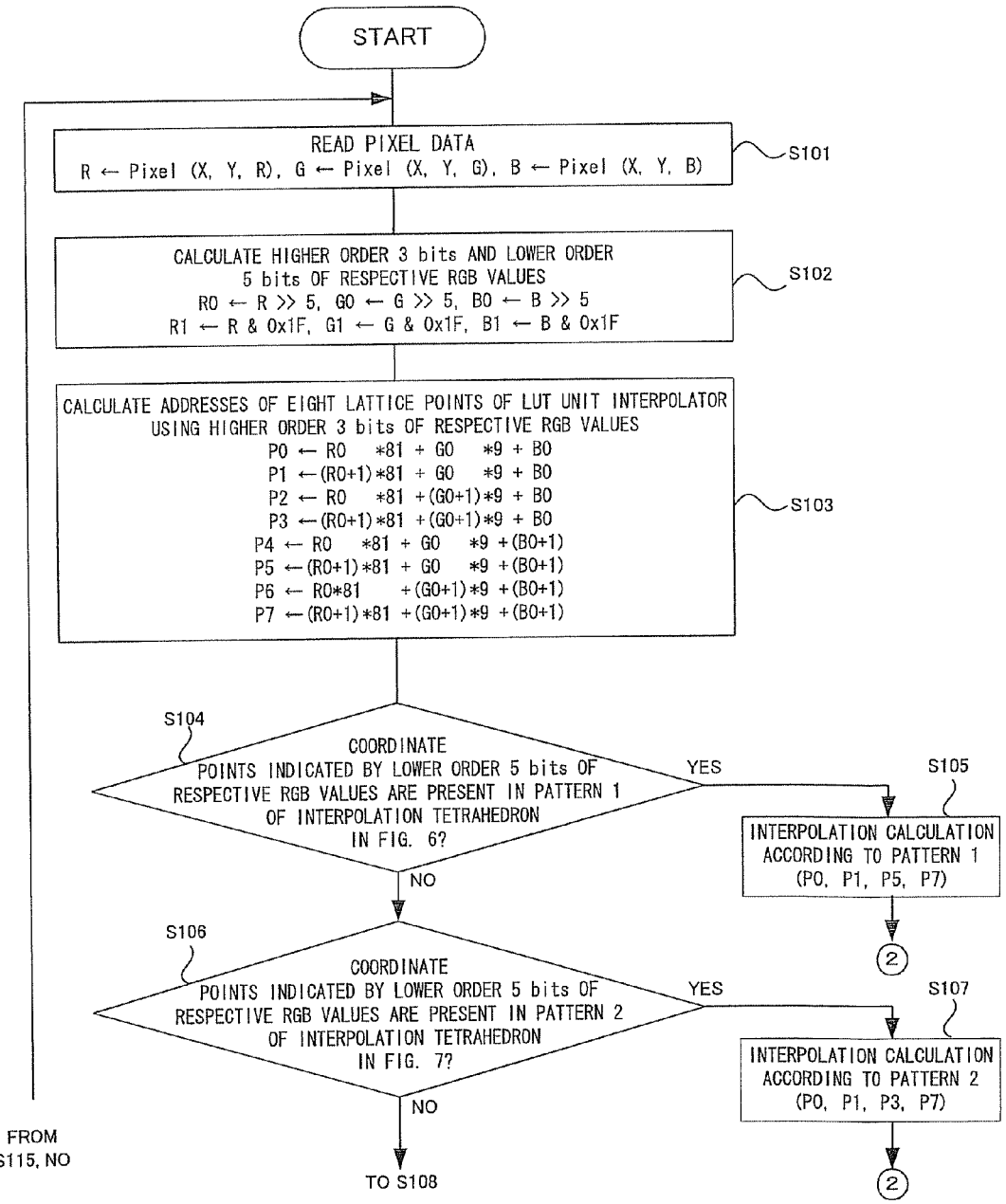
FIG. 12 is a flowchart showing a flow of processing of general color conversion processing by a four-point interpolation method.
Figure 13:
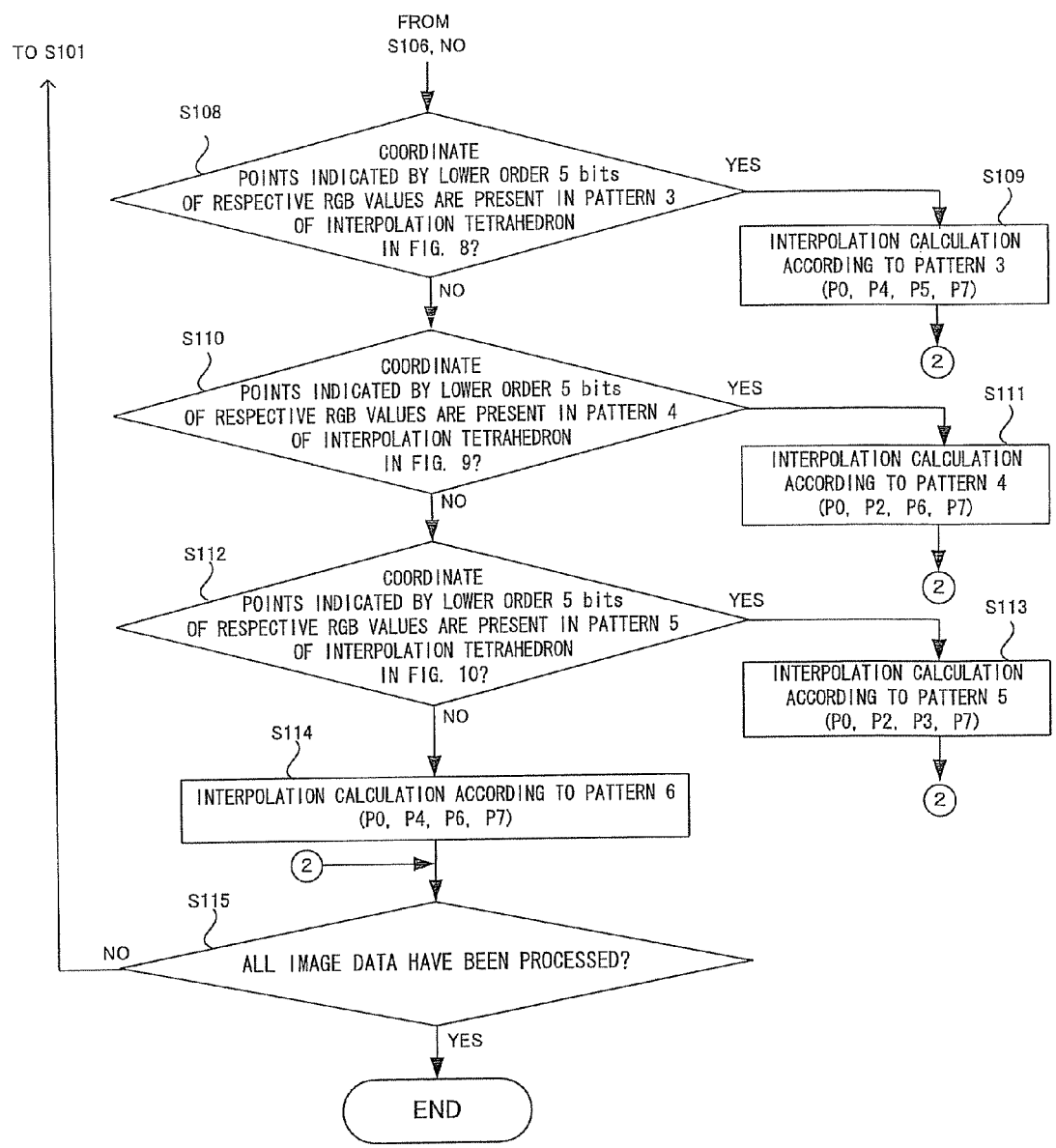
FIG. 13 is a flowchart showing the flow of the processing of the general color conversion processing by the four-point interpolation method.

FIGS. 12 and 13 are flowcharts showing a flow of processing of general color conversion processing according to the four-point interpolation method. First, the color conversion apparatus 1 acquires an R value, a G value, and a B value as input values (S101) and divides a color component value of each of the input values into a higher order 3 bits and a lower order 5 bits (S102). Subsequently, the color conversion apparatus 1 specifies, on the basis of a value of the higher order 3 bits of the color component value, a cubic lattice on the RGB color space to which the input value belongs and calculates reference addresses of eight vertices of the cubic lattice (S103).

Figure 14:
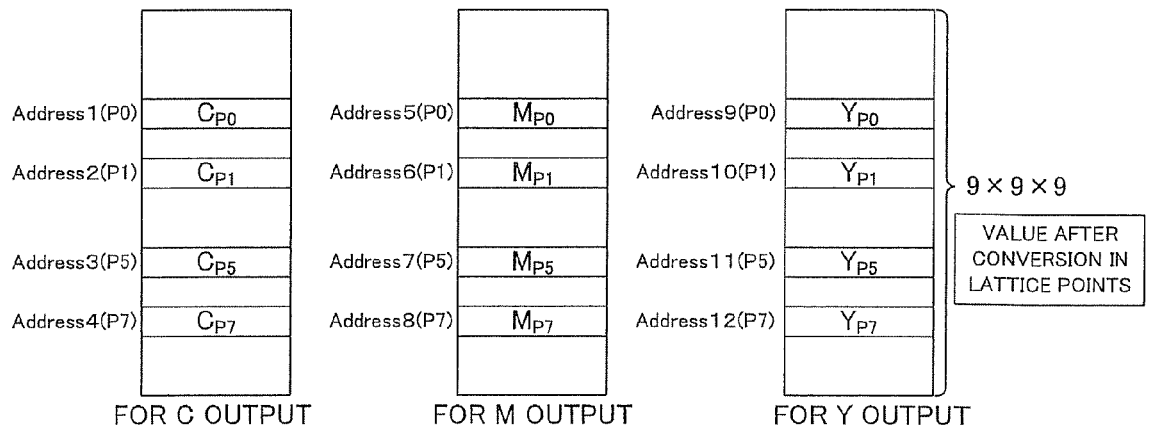
FIG. 14 is a diagram showing a data structure of a conventional LUT.

Subsequently, the color conversion apparatus 1 discriminates to which of six kinds of triangular pyramid areas included in the cubic lattice specified as described above the input value belongs (S104, S106, S108, S110, and S112) and determines reference addresses of color conversion values corresponding to four lattice points forming the triangular pyramid area to which the input value belongs. For example, when the input value belongs to a triangular pyramid area of a "pattern 1" shown in FIG. 6, for respective colors of output values CMY corresponding to lattice points P0, P1, P5, and P7 shown in FIG. 6, values of the lattice points are read out from an LUT shown in FIG. 14 on the basis of memory addresses. In the conventional LUT shown in FIG. 14, color conversion values corresponding to lattice points are arrayed with coordinate axes indicating coordinates of the lattice points as references.

Figure 15:
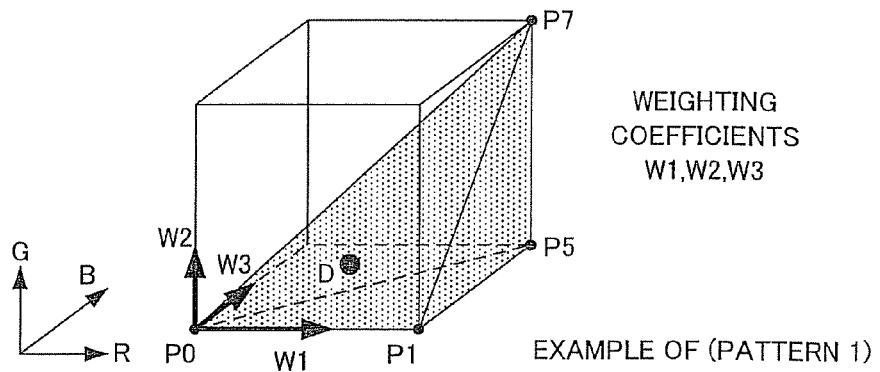
FIG. 15 is a diagram for explaining the four-point interpolation method.

The color conversion apparatus 1 calculates an output value D using Equation (1) as the interpolation formula on the basis of LUT values corresponding to the four lattice points (P0, P1, P5, and P7) read out from the MEMORY 802 as described above and three weighting coefficients (W1, W2, and W3) stored in the MEMORY 802 (S105, S107, S109, S111, S113, and S114) (see FIG. 15). The color conversion apparatus 1 executes this processing by the number of color components (here, three kinds of C, M, and Y) of the conversion LUT. The color conversion apparatus 1 repeats this processing by the number of pixels of image data as an object of the processing (S115) and finishes the color conversion processing.

Execution of an SIMD command in the color conversion apparatus 1 according to this embodiment and an LUT structure suitable for the SIMD command will be explained.

In an example of the general color conversion processing (see FIGS. 12 to 14), for one conversion LUT, at least four times of memory reference for four lattice points, calculation processing for reference addresses involved in the memory reference, and branch processing for discriminating a triangular pyramid area are performed. As a method of reducing calculation of reference addresses, a method of arranging lattice points of all vertices of a cubic lattice in order has been proposed. However, this method is suitable when all lattice points of a cube are referred to as in the eight-point interpolation method but is not suitable when cubic lattices are further divided into areas as in the four-point interpolation method because address calculation for determining reference areas is necessary. Concerning the number of times of memory reference, since four lattice points have to be selected from data of eight lattice points according to selected areas, random access to a memory area occurs and the number of times of memory reference cannot be reduced.

An LUT structure suitable for processing employing an SIMD command adopted in this embodiment will be explained in detail.

Figure 16:
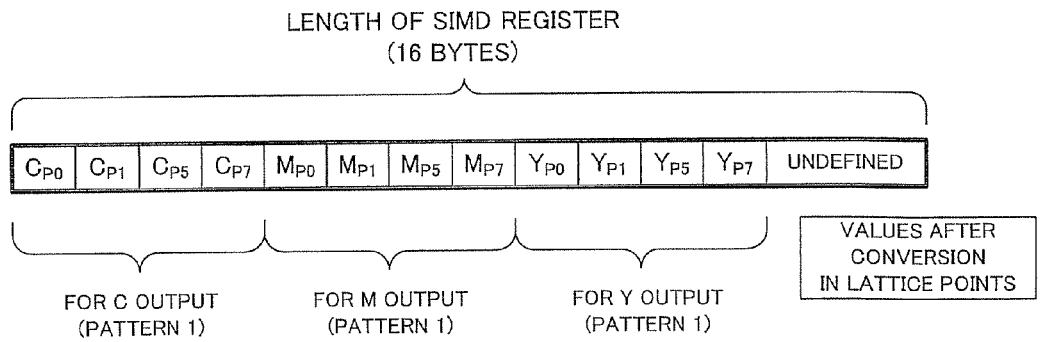
FIG. 16 is a diagram showing a data structure in which data is arranged by a unit of register length of an SIMD command.

In general, when a register length of the register 801r used in an SIMD command is 16 bits, an access to the MEMORY 802 employing the SIMD command needs to be arranged in addresses of a multiple of 16. Therefore, in the LUT in this embodiment, as shown in FIG. 16, a data structure is formed to arrange data by a unit of register length of the SIMD command.

When LUT data is not stored in the MEMORY 802 by a unit of register length of the register 801r, it is necessary to move data read out from the memory to an appropriate position. It is impossible to acquire necessary data from the MEMORY 802 in one memory access (when there are only six valid data even if eight data are necessary, following data have to be read out from the MEMORY 802 to acquire the remaining two valid data).

On the other hand, as in this embodiment, when data is stored in the memory by a unit of register length of the register 801r in advance, since necessary data is in an appropriate position in the memory area (e.g., an arithmetic slot 0 is in a triangular pyramid 0), it is possible to use data read out from the memory area as it is.

Figure 18:
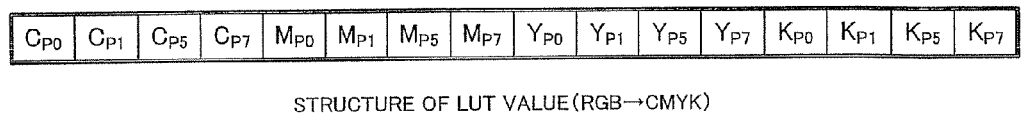
FIG. 18 is a diagram showing a structure of an LUT value in the case in which the number of color components of an output value is set to four (CMYK)
Figure 17:
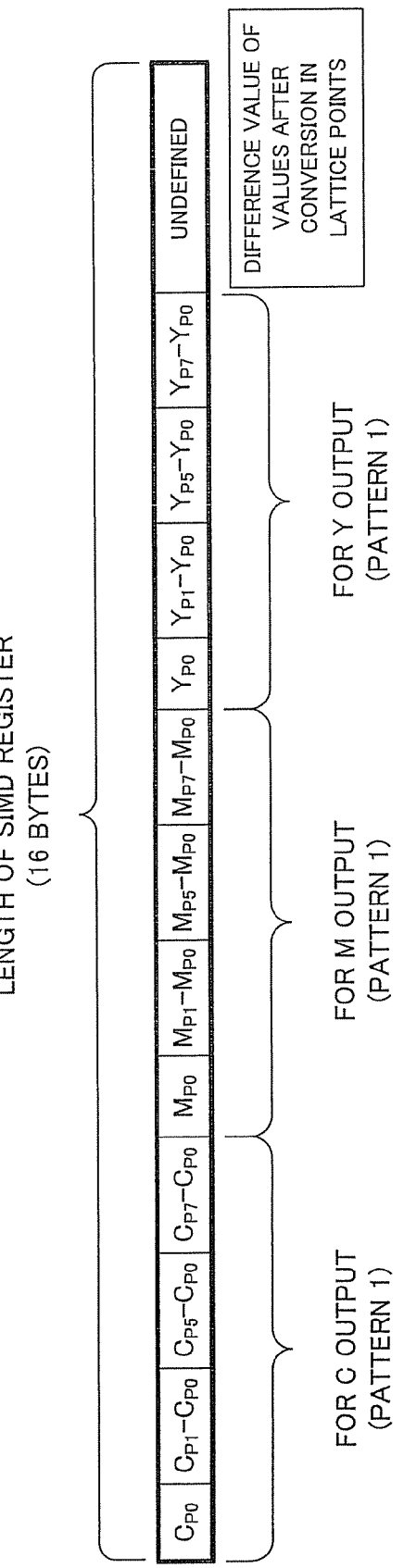
FIG. 17 is a diagram showing an example in which a difference value is stored in an LUT.

In this embodiment, in order to reduce the number of times of reference to the MEMORY 802, it is possible to refer to all color conversion values of an LUT necessary for interpolation calculation in a minimum number of times of memory access. In an example described here, a color conversion value stored in the LUT shown in FIG. 16 is an output value after color conversion processing per se. However, the color conversion value is not limited to this. A difference value of an output value calculated in Equation (1) may be calculated in advance and stored and used as shown in FIG. 17. The number of color components of the output value in FIG. 16 is three (CMY). However, for example, when the second color space is the CMYK color space, as shown in FIG. 18, the number of color components of an output value is four (CMYK) as shown in FIG. 18.

Figure 19:
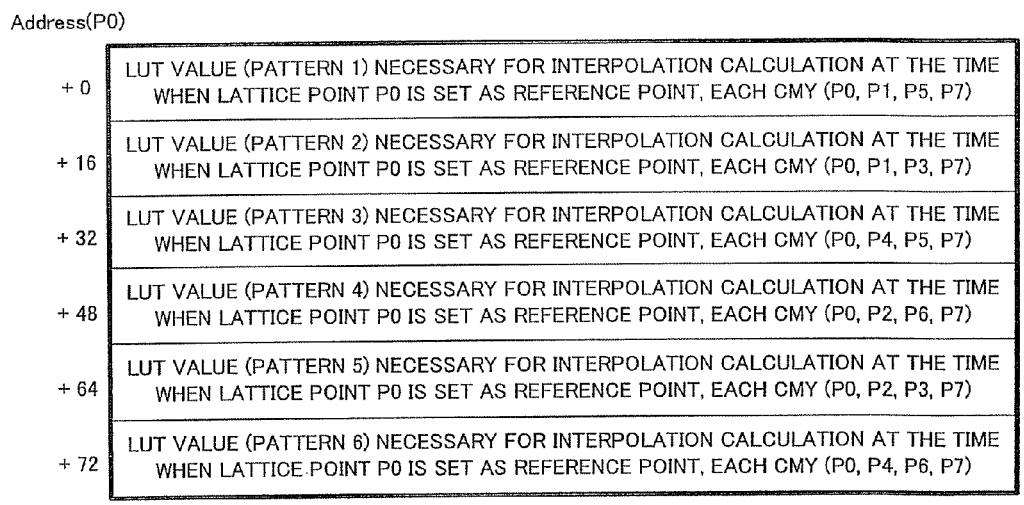
FIG. 19 is a diagram showing details of a method of storing LUT values in a memory area.
Figure 20:
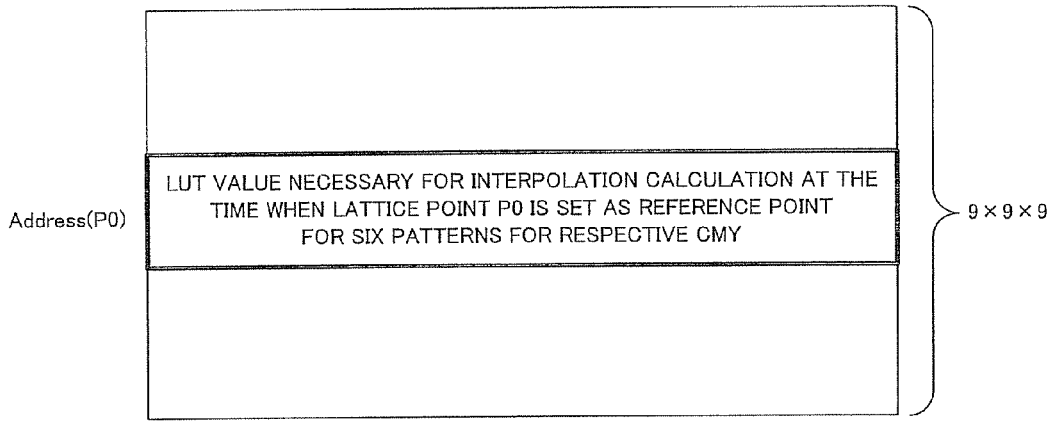
FIG. 20 is a diagram showing an example in which LUT values for six polyhedrons are stored with respect to a reference address.

Specifically, plural color conversion values associated with respective plural lattice points (e.g., for the triangular pyramid area of the pattern 1, P0, P1, P5, and P7) included in six kinds of polyhedrons in the three-dimensional look up table are stored in the MEMORY 802 such that storage addresses thereof are adjacent to one another (see FIG. 19). As shown in FIG. 20, LUT values (color conversion values) for six polyhedrons (six patterns) may be stored with respect to a certain reference address (P0).

Consequently, it is possible to acquire color conversion values associated with plural lattice points included in a certain polyhedron in one memory access and prevent occurrence of delay in processing due to frequency memory access.

Figure 21:
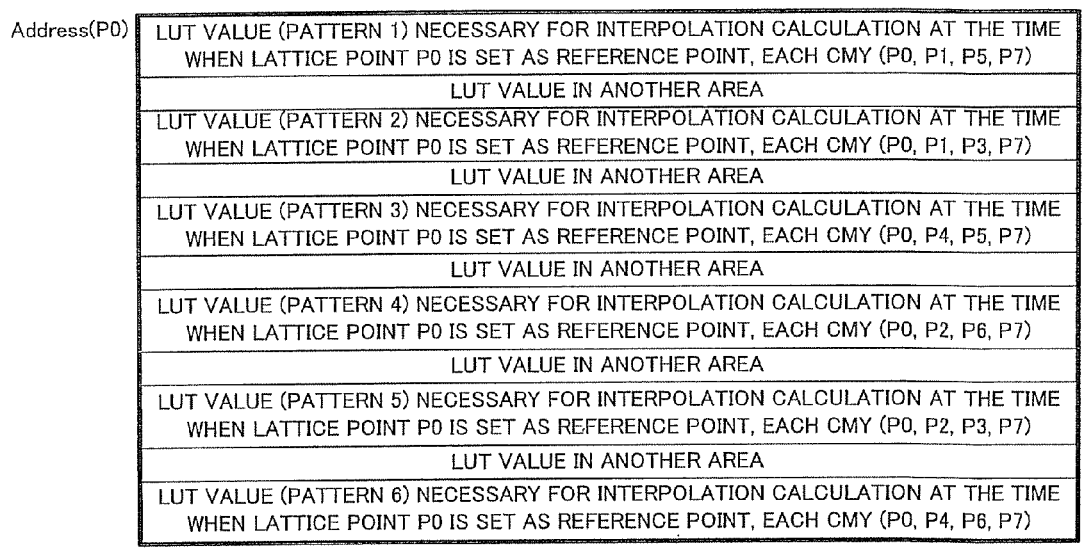
FIG. 21 is a diagram showing an example in which intervals among starting addresses of a memory area in which plural color conversion values are stored, respectively, are predetermined intervals.

Plural color conversion values associated with plural polyhedrons obtained by dividing the cubic lattice may be stored (near the reference address (P0) calculated earlier) such that intervals among starting addresses of the MEMORY 802 in which the plural color conversion values are stored, respectively, are predetermined intervals (see FIG. 21).

By storing the color conversion values of the respective plural polyhedrons in the memory area at the predetermined intervals, if a storage address of any one polyhedron among plural polyhedrons obtained by dividing a certain cubic lattice is known, it is possible to acquire color conversion values of lattice points forming the other five kinds of polyhedrons by simply adding a predetermined shift value to the storage address. In this way, it is possible to reduce cost for address calculation to zero by performing the address calculating only with the addition of a shift value.

Since most processors include cache memories, an arithmetic operation ability may be affected by a method of arraying data in a memory area. Thus, it is preferable to adopt an optimum one of data arrays shown in FIGS. 19 and 21 according to a characteristic of image data used.

Concerning address calculation for referring to the LUT, which has the data structure described above, in the MEMORY 802, discrimination processing for a triangular pyramid area, and interpolation operation employing an LUT value corresponding to the triangular pyramid area discriminated, a method of realizing an increase in speed of processing using an SIMD command will be explained.

Figure 22:
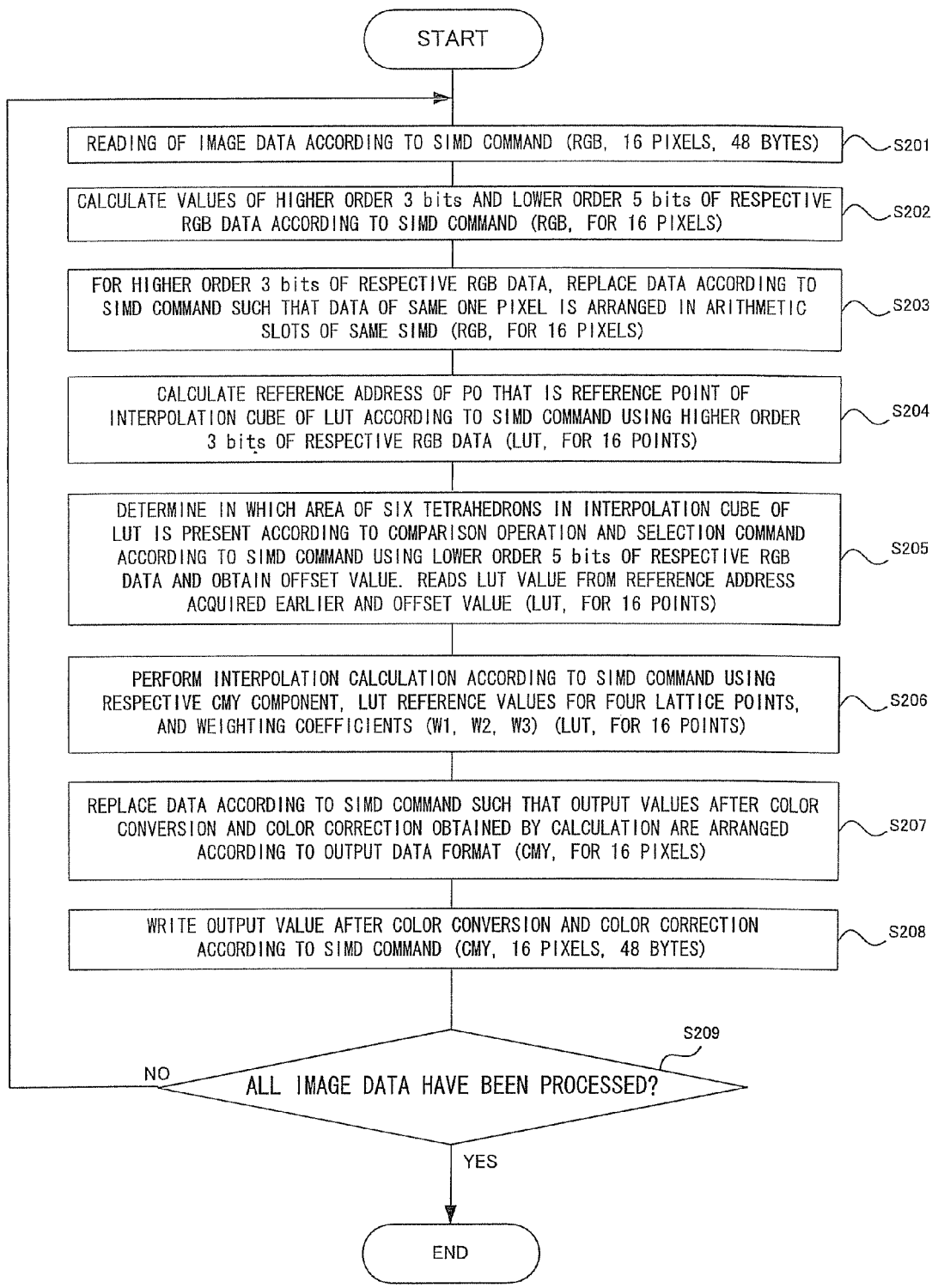
FIG. 22 is a flowchart showing a flow of processing of color conversion processing employing an SIMD command in the color conversion apparatus according to the embodiment.

FIG. 22 is a flowchart showing a flow of processing of color conversion processing employing an SIMD command in the color conversion apparatus according to this embodiment. Differences from the processing shown in FIGS. 12 and 13 are that the address calculation performed by using the SIMD command and the interpolation calculation processing are executed for plural pixels in parallel and the conditional branch command is not used in discriminating a triangular pyramid area to which an input color belongs.

In general, in an arithmetic operation employing the SIMD command, since speed of processing is increased in proportion to the number of data that can be processed in parallel, it is possible to increase speed to be four times higher at the maximum when four data are processed in parallel. Considering the fact that an operating clock frequency of latest processors in recent years has reached the limit, it can be said that the numerical value of four times has an extremely large effect.

In the color conversion apparatus according to this embodiment, since the conditional branch command is not used, an effect of an increase in speed is also considerably large. High-speed processors in recent years have a large number of pipeline stages to increase a frequency of clock. Some high-speed processors have pipelines exceeding twenty stages. Therefore, a technique such as branch prediction is used to prevent branch mistakes as much as possible. However, the branch prediction may be wrong. When the branch prediction is wrong, results of processing in a pipeline performed in look-ahead are discarded and a command of a branch destination is executed from the beginning. Thus, a considerable delay time is required until a final processing result is obtained.

Since this delay time has a larger penalty as the number of pipeline stages is larger, a stable increase in speed cannot be guaranteed. In other words, when the conditional branch is eliminated, pipeline install due to a branch mistake does not occur and a stable increase in speed is promised. In some cases, this is equivalent to a two to three times increase in speed.

Figure 23:
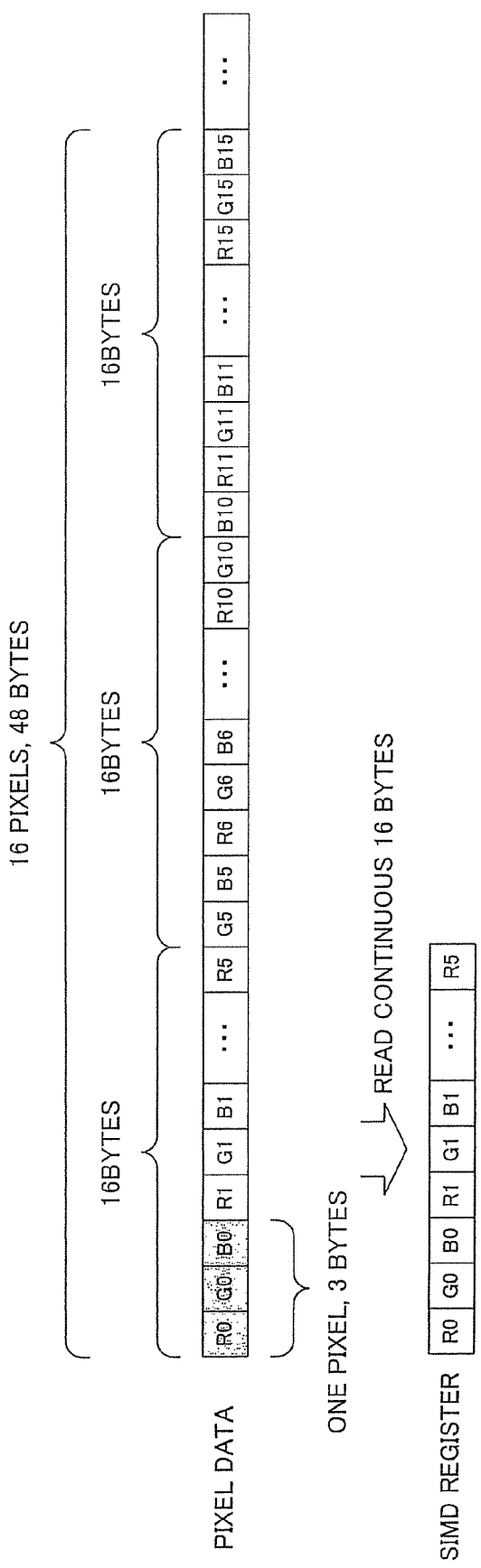
FIG. 23 is a diagram for explaining details of the color conversion processing in the color conversion apparatus according to the embodiment.

Details of color conversion processing in the color conversion apparatus according to this embodiment will be explained with reference to FIGS. 23 to 29. First, the color-value acquiring unit 101 loads image data (an input value) as an object of color conversion to the SIMD registers 801r using an SIMD command (S201) as shown in FIG. 23. In this case, since one pixel has 3 bytes, the color-value acquiring unit 101 loads 48 bytes for six pixels to three SIMD registers.

Figure 24:
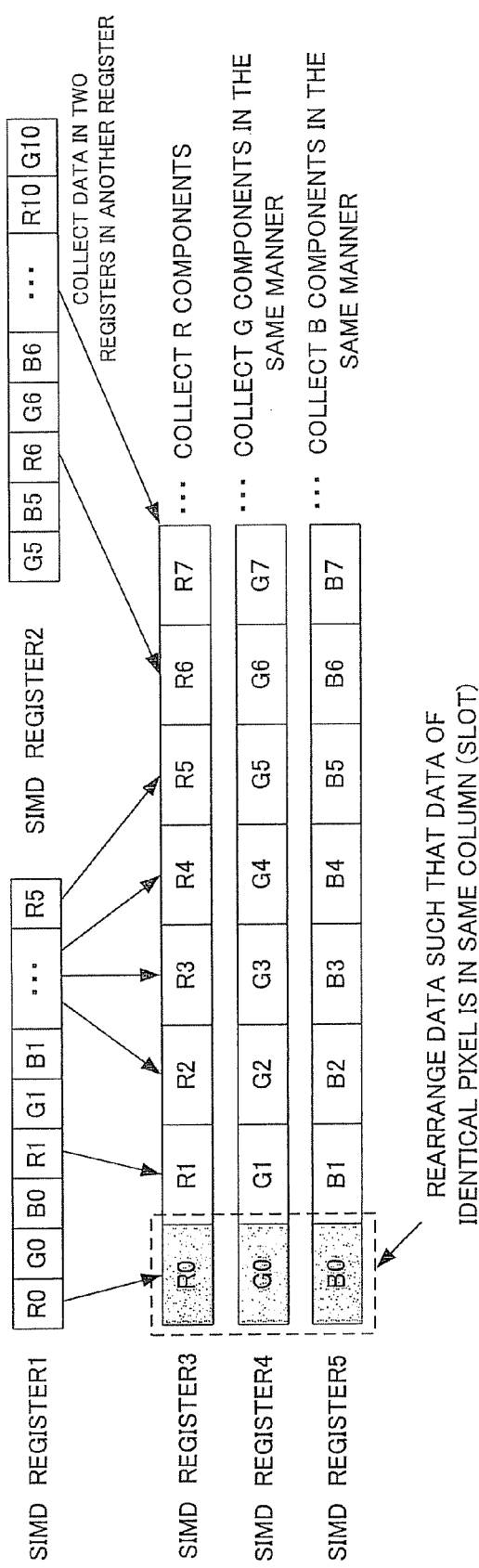
FIG. 24 is a diagram for explaining details of the color conversion processing in the color conversion apparatus according to the embodiment.

Subsequently, as shown in FIG. 24, the color-value acquiring unit 101 performs replacement of data using the SIMD command, divides the data into three kinds of components, an R component, a G component, and a B component, and stores the components in the registers (S203).

Figure 25:
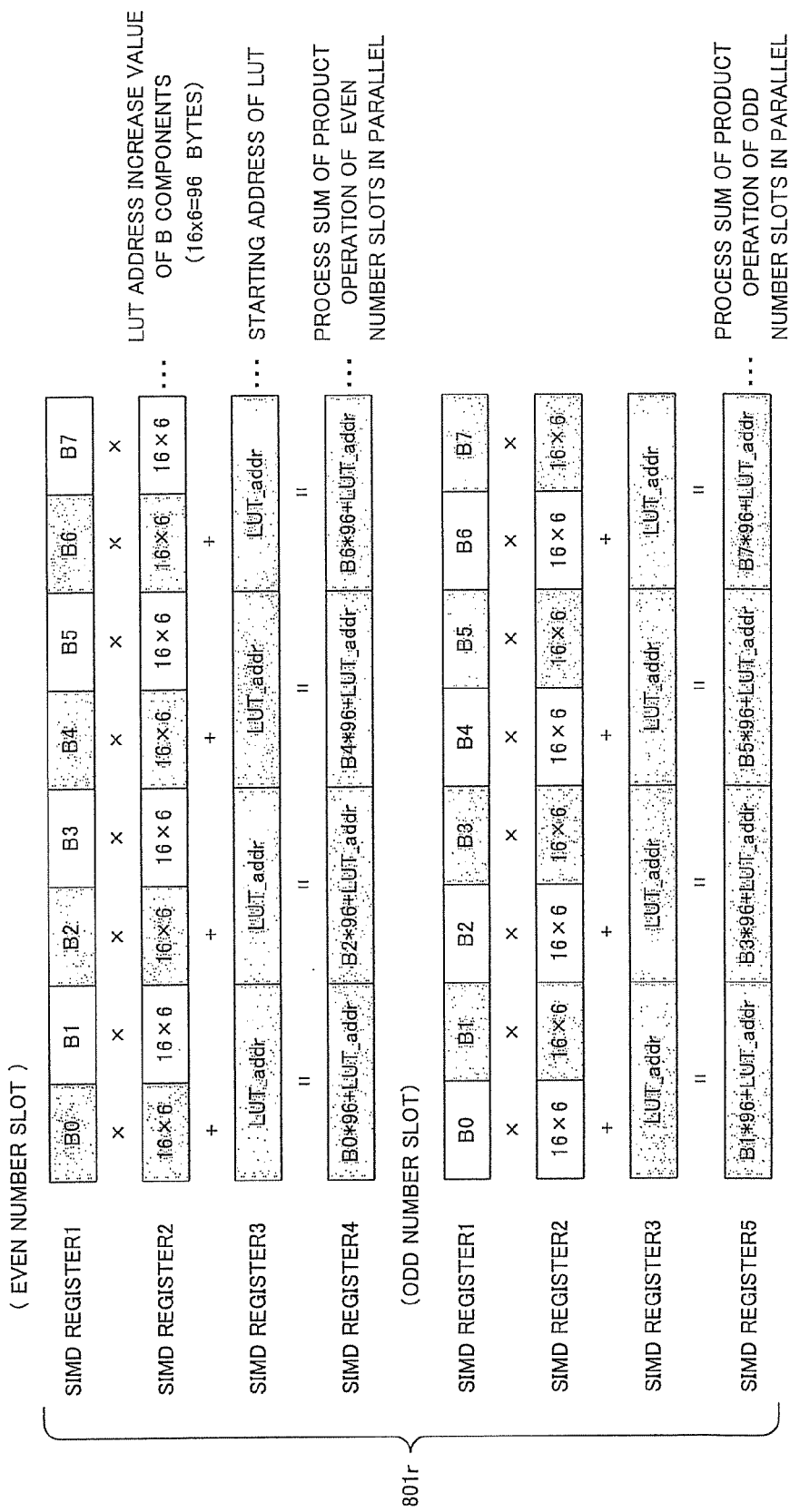
FIG. 25 is a diagram for explaining details of the color conversion processing in the color conversion apparatus according to the embodiment.

Subsequently, as shown in FIG. 25, the color-value acquiring unit 101 multiplies the R component, the G component, and the B component by constants, respectively, to calculate a sum and adds a starting address of the LUT to the sum to calculate a reference address (S204) using the SIMD command. In FIG. 25, for convenience of explanation, only contents of an arithmetic operation for the B component are described, the sum of product operation is performed for the R component and the G component in the same manner to obtain a reference address according to Equation (2) below.

$$\text{Reference Address} = \text{LUT\_addr} + B*b*16 + G*6*9*16 + R*6*81*16 \quad (2)$$

Values of the R, G, and B components described in FIGS. 23 to 25 are values of higher order bits for calculating an LUT reference address (in the case of 9×9×9 division, values of higher order 3 bits are in a range of 0 to 8).

Figures 26, 27:
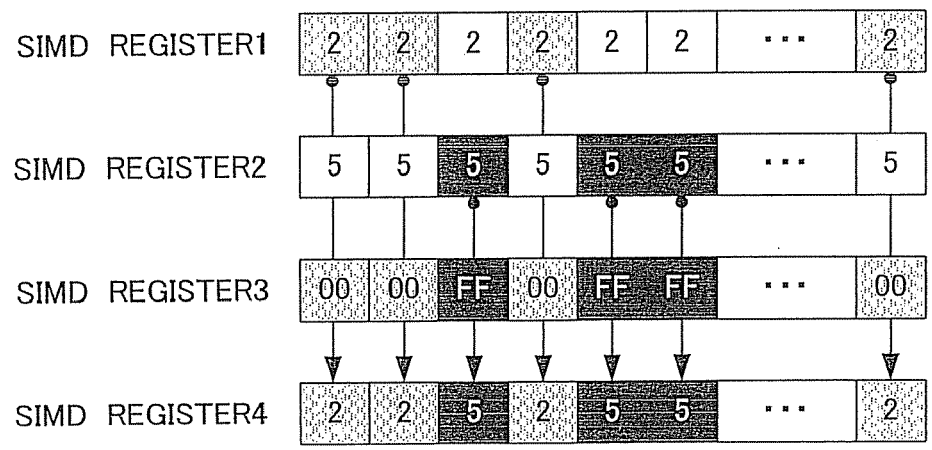
FIG. 26 is a diagram for explaining details of the color conversion processing in the color conversion apparatus according to the embodiment.
FIG. 27 is a diagram for explaining details of the color conversion processing in the color conversion apparatus according to the embodiment.

In processing shown in FIGS. 26 and 27, the color-value acquiring unit 101 discriminates to which of six triangular pyramid areas in the four-point interpolation method an input color belongs (S205). Values of the R component, the G component, and the B component described in FIGS. 26 and 27 are values of lower order 5 bits (in the case of 9×9×9 division, values of lower order 5 bits are in a range of 0 to 31). In the conventional color conversion processing, discrimination of a triangular pyramid area is realized using a conditional branch command such as an if statement. However, in this embodiment, the discrimination of a triangular pyramid area is realized by a comparison operation command and a selection operation command in the SIMD command. Here, the processing shown in FIG. 26 is executed according to a comparison command and the processing shown in FIG. 27 is executed by a selection command.

Figure 28:
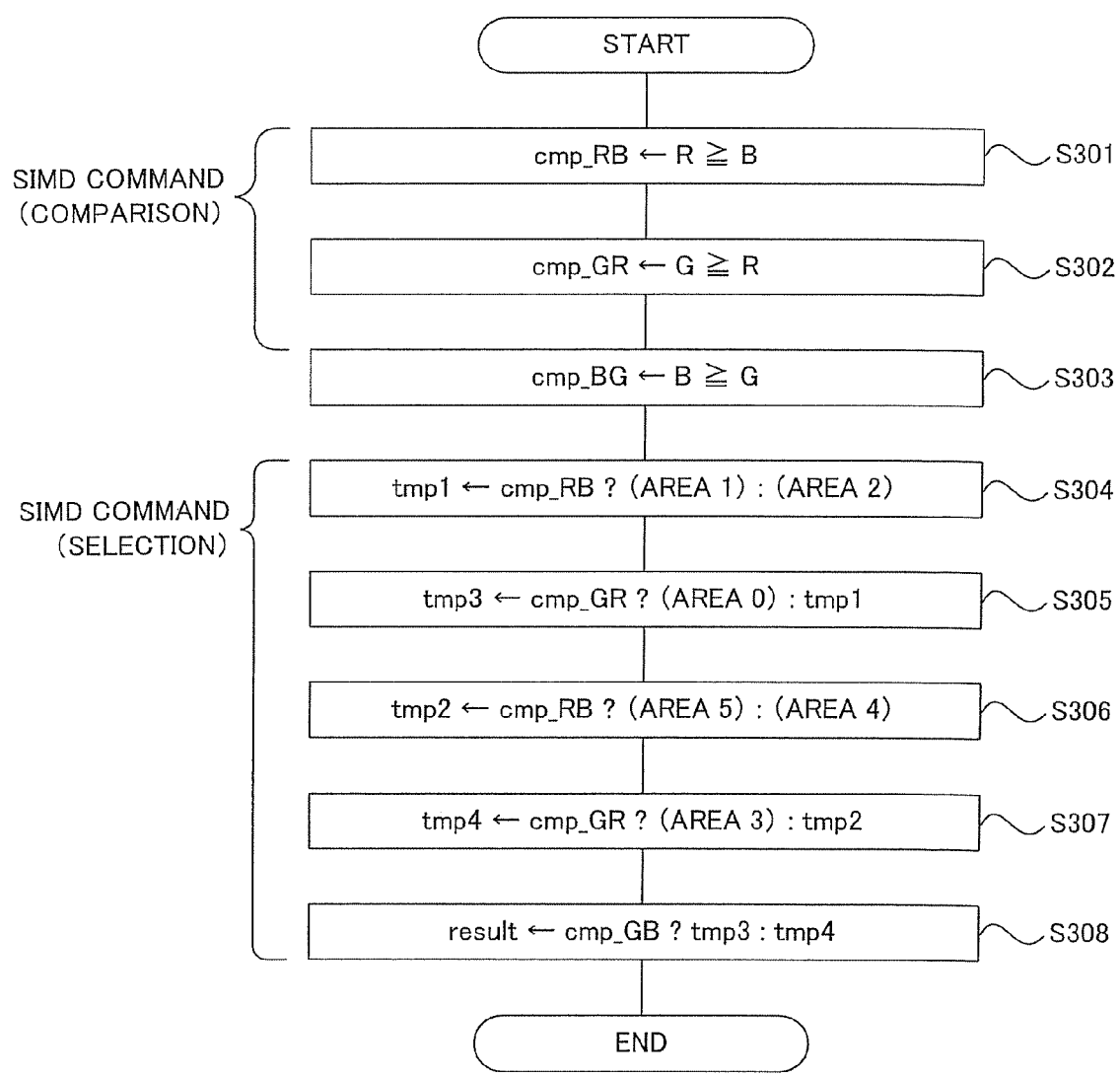
FIG. 28 is a diagram for explaining details of the color conversion processing in the color conversion apparatus according to the embodiment.

Details of the discrimination processing for a triangular pyramid area are shown in a flowchart in FIG. 28. As shown in the figure, it is seen that a comparison operation is performed in processing in S301 to S303 and a selection operation is performed in processing in S304 to S308.

In the comparison command, the value is "0" or "−1" depending on a comparison result. In the selection command, when the value is "0", the value is acquired from the register 1, and, when the value is "−1", the value is acquired from the register 2. At this point, a value of an SIMD register as a selection object is equivalent to an offset value that corresponds to an area (the offset value is equivalent to a "polyhedron identification number" and, in the example shown in FIG. 19, a multiple of 16).

Figure 29:
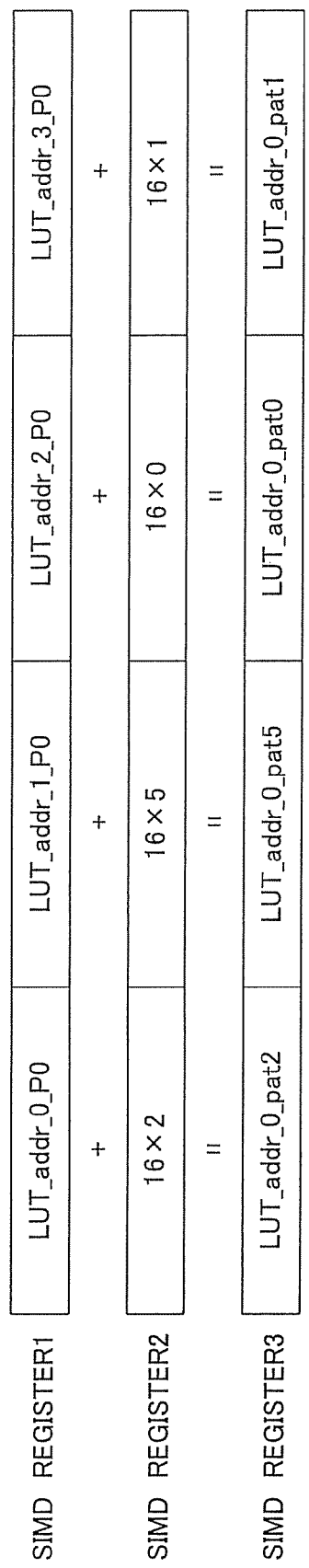
FIG. 29 is a diagram for explaining details of the color conversion processing in the color conversion apparatus according to the embodiment.

When this value is added to a calculated LUT reference address (P0) as shown in FIG. 29, an address value in which a necessary color conversion value (a coefficient, etc.) is stored is obtained. Subsequently, the color-value acquiring unit 101 reads out LUT data in this address (S205) and performs interpolation calculation according to the SIMD command (S206).

Contents of processing of an interpolation formula are a sum of product operation shown in Equation (1), processing similar to the processing in FIG. 25 is performed.

Figure 30:
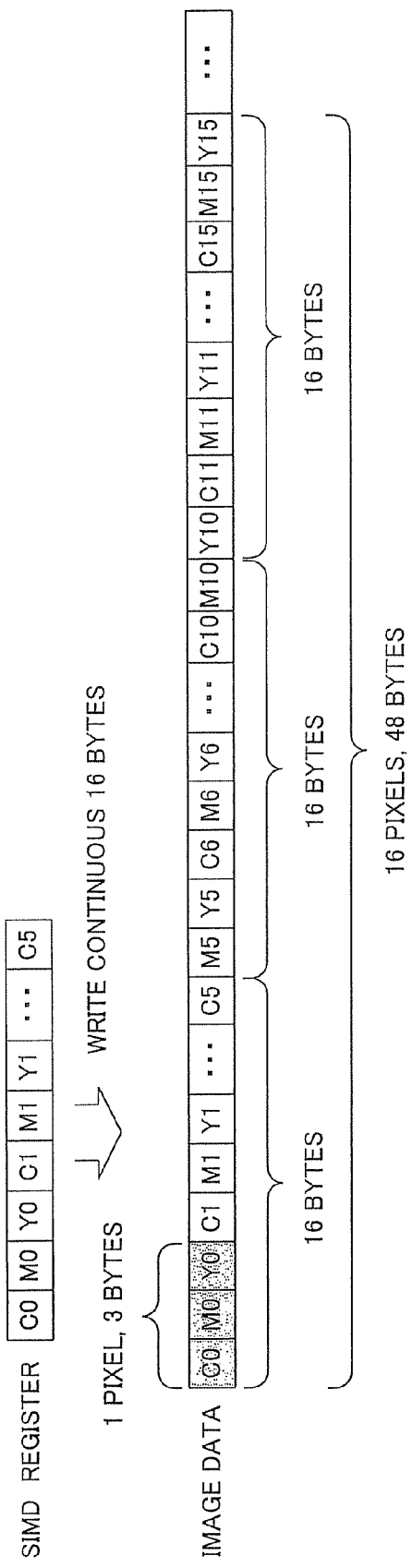
FIG. 30 is a diagram showing a processing result (color values after color conversion) obtained by an interpolation operation.

Finally, the color-value acquiring unit 101 rearranges a processing result (a color value after color conversion) obtained by the interpolation operation as shown in FIG. 30 and stores the processing result in the MEMORY 802 (S207 and S208). Consequently, the color conversion processing for sixteen pixels is finished. The color conversion processing is completed when the same processing is applied to the entire image data as an object of the processing (S209).

Figure 31:
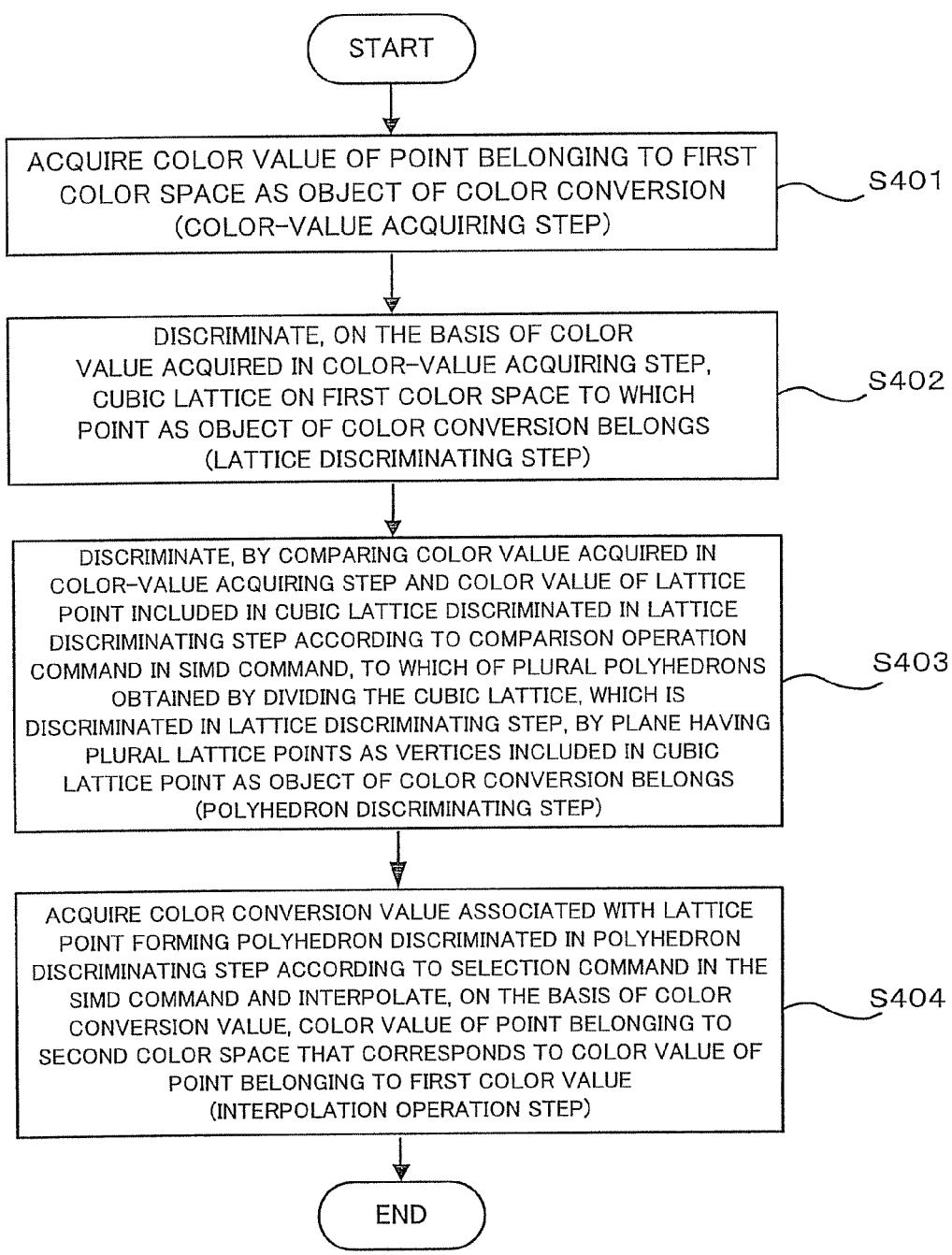
FIG. 31 is a flowchart for explaining a flow of rough processing (a color conversion method) in the color conversion apparatus according to the embodiment.

FIG. 31 is a flowchart for explaining a flow of rough processing (a color conversion method) in the color conversion apparatus according to this embodiment.

The color-value acquiring unit 101 acquires a color value of a point belonging to the first color space as an object of color conversion (a color-value acquiring step) (S401).

The lattice discriminating unit 102 discriminates, on the basis of the color value acquired in the color-value acquiring step, a cubic lattice on the first color space to which the point as an object of color conversion belongs (a lattice discriminating step) (S402).

The polyhedron discriminating unit 103 discriminates, by comparing the color value acquired in the color-value acquiring step and a color value of a lattice point included in the cubic lattice discriminated in the lattice discriminating step according to the comparison operation command in the SIMD command, to which of plural polyhedrons obtained by dividing the cubic lattice, which is discriminated in the lattice discriminating step, with a plane having plural lattice points as vertices included in the cubic lattice the point as an object of color conversion belongs (a polyhedron discriminating step) (S403).

Specifically, in the polyhedron discriminating step, the polyhedron discriminating unit 103 compares, without using the conditional branch command, the color value acquired in the color-value acquiring step and a color value of the lattice point included in the cubic lattice discriminated in the lattice discriminating step according to the comparison operation command in the SIMD command. The polyhedron discriminating unit 103 acquires, on the basis of a result of the comparison operation, a polyhedron identification number (e.g., a multiple of a basis unit size forming a three-dimensional look up table) indicating a polyhedron to which a point as an object of color conversion among the plural polyhedrons obtained by dividing the cubic lattice, which is discriminated in the lattice discriminating step, with a plane having plural lattice points included in the cubic lattice according to the selection operation command in the SIMD command.

The interpolation operation unit 104 acquires a color conversion value associated with the lattice point forming the polyhedron discriminated in the polyhedron discriminating step according to the selection command in the SIMD command and interpolates, on the basis of the color conversion value, a color value of a point belonging to the second color space that corresponds to the color value of the point belonging to the first color space (an interpolation operation step) (S404).

In the interpolation operation step, the interpolation operation unit 104 acquires, on the basis of the polyhedron identification number acquired in the polyhedron discriminating step, a storage address of a color conversion value associated with the polyhedron corresponding to the polyhedron identification number according to an arithmetic operation and acquires a color conversion value stored in the storage address in a predetermined memory area.

In this way, by performing the discrimination of a polyhedron employing the comparison operation command and the acquisition of a color conversion value corresponding to a lattice point forming the polyhedron employing the selection command instead of the conditional branch command such as an if statement (in the processing, a so-called arithmetic branch is realized by using both the comparison operation command and the selection command in the SIMD command), it is possible to prevent occurrence of pipeline install due to discard of a processing result when a branch prediction is wrong and it is possible to realize an increase in speed of processing employing the SIMD command.

By performing the interpolation operation based on a fewer number of lattice points, it is possible to reduce processing loads on the CPU in the interpolation operation compared with, for example, the eight-point interpolation in which all lattice points forming vertices of a cubic lattice are used.

Second Embodiment

A second embodiment of the invention will be explained.

This embodiment is a modification of the first embodiment and is different from the first embodiment mainly in a structure of an interpolation operation unit. In the following description, components having functions same as those of the components already explained in the first embodiment are denoted by the identical reference numerals and signs and explanations of the components are omitted.

Figure 32:
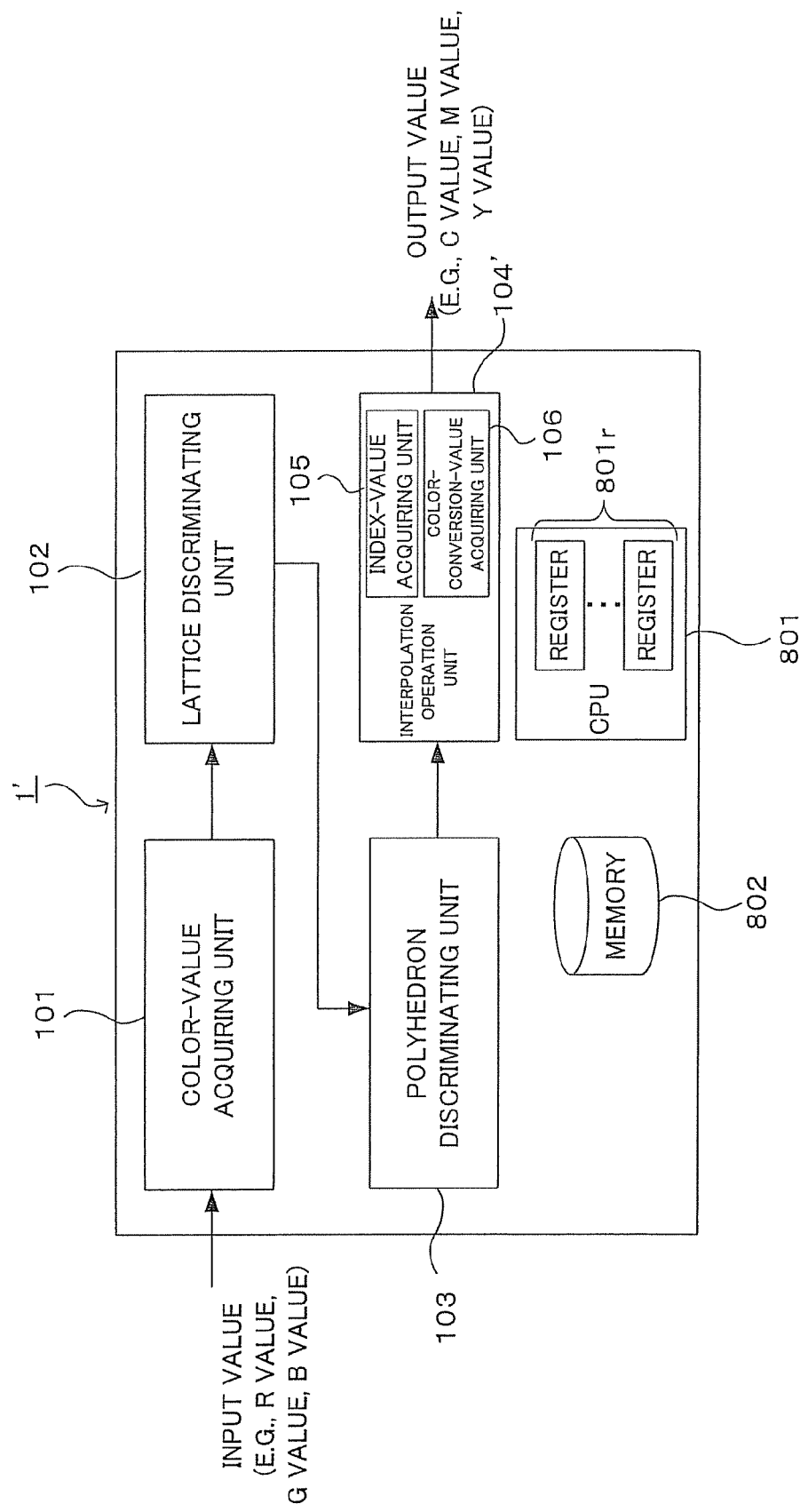
FIG. 32 is a functional block diagram showing a structure of a color conversion apparatus according to a second embodiment of the invention.

FIG. 32 is a functional block diagram showing a structure of a color conversion apparatus according to the second embodiment of the invention.

The color conversion apparatus 1' according to this embodiment includes the color-value acquiring unit 101, the lattice discriminating unit 102, the polyhedron discriminating unit 103, an interpolation operation unit 104', the CPU 801, and the MEMORY 802. The interpolation operation unit 104' in this embodiment includes an index-value acquiring unit 105 and a color-conversion-value acquiring unit 106.

The index-value acquiring unit 105 acquires an index value indicating a lattice point forming a polyhedron discriminated by the polyhedron discriminating unit 103.

The color-conversion-value acquiring unit 106 acquires, on the basis of the index value acquired by the index-value acquiring unit 105, color conversion values associated with respective plural lattice points forming the polyhedron according to a shuffle command (allocates the color conversion values to registers).

The first embodiment is suitable when a data size of a look up table is relatively small but has a disadvantage that a large capacity of memory is required when a size of the look up table is large such as "33×33×33". Thus, in this embodiment, a method that can reduce memory usage will be explained.

Figure 33:
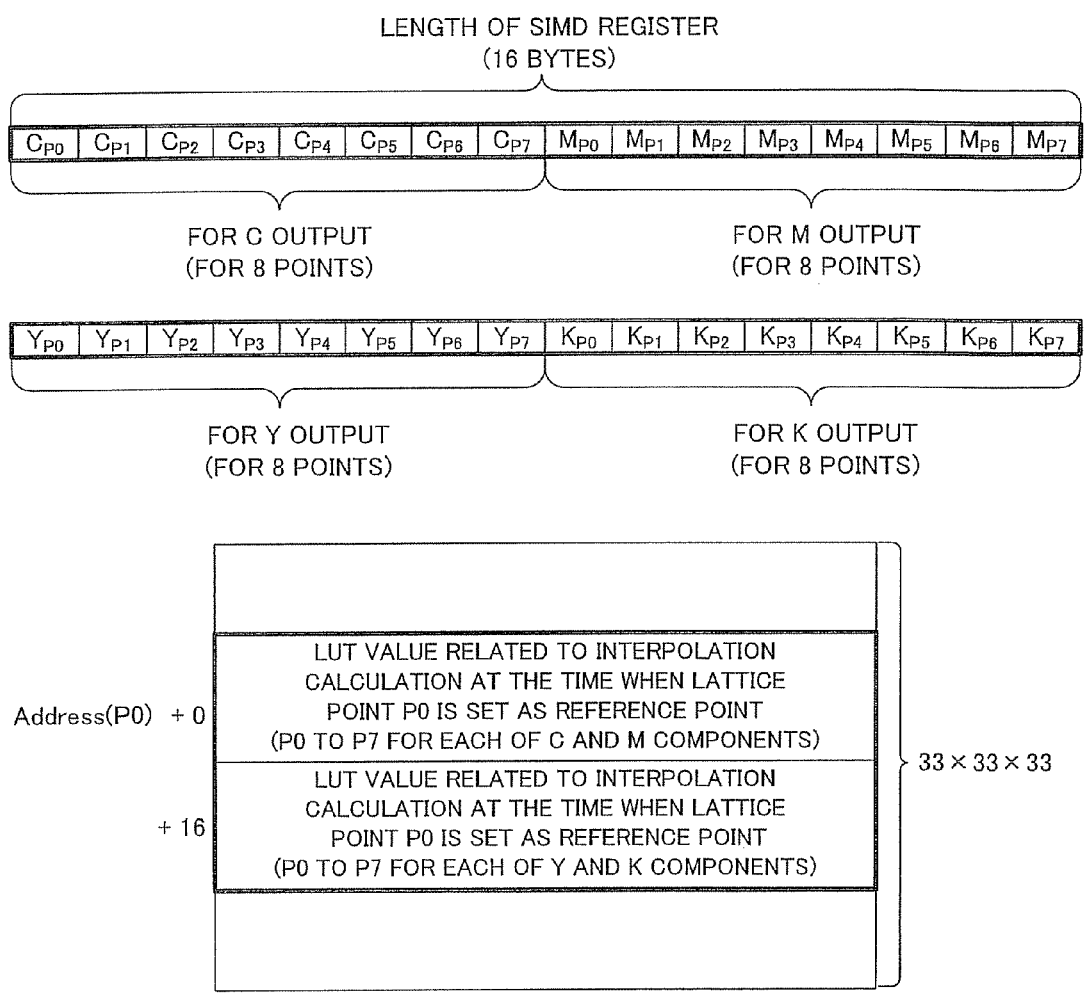
FIG. 33 is a diagram showing a structure of a look up table in the embodiment.

Specifically, this embodiment is different from the first embodiment in that memory usage is reduced by combining, as a structure of the look up table, eight points (for respective CMYK) related to interpolation calculation with P0 as a vertex as shown FIG. 33 and selection and extraction patterns (six patterns) in FIG. 34 that make it possible to generate the six patterns in the embodiment described above.

Figure 35:
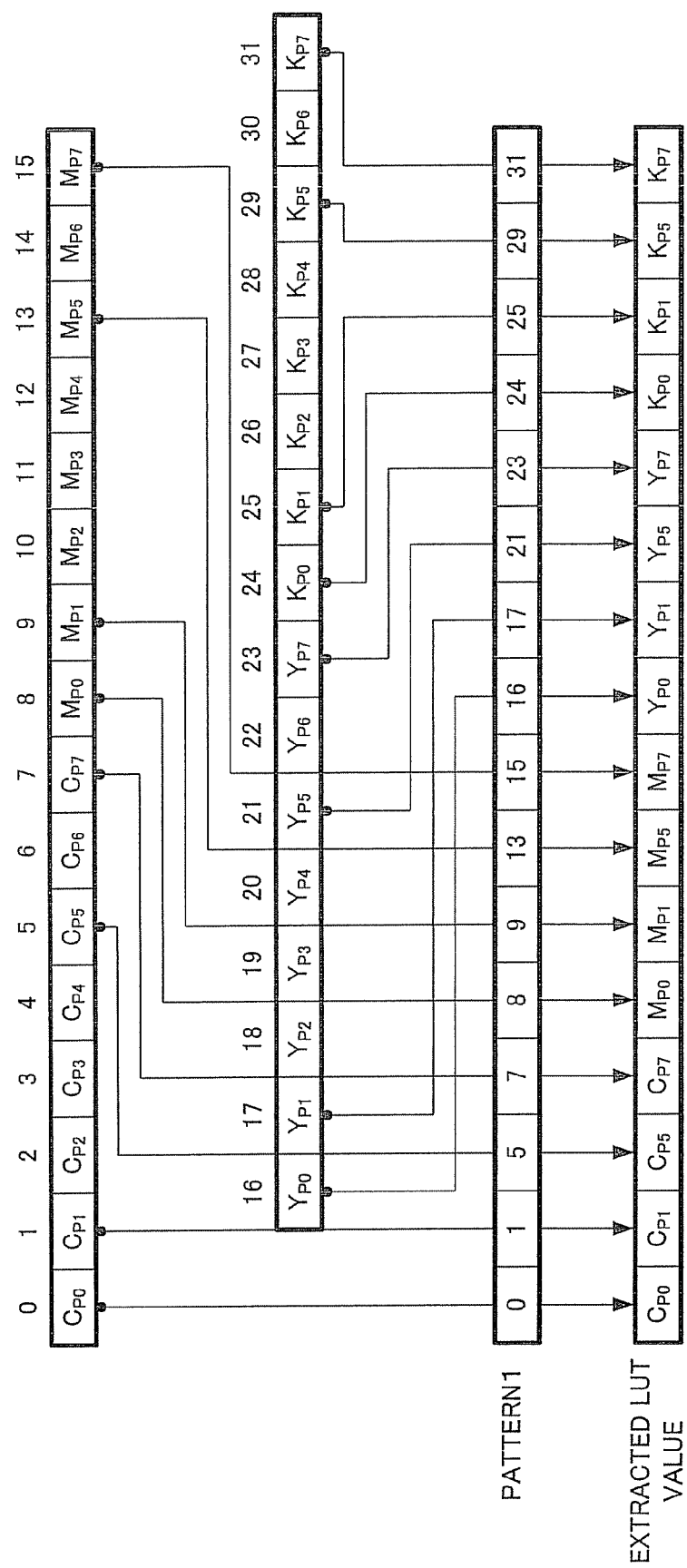
FIG. 35 is a diagram showing an outline of a selection and extraction command.

By combining a selection and extraction command and the look up table using the selection and extraction patterns (six patterns), it is possible to obtain an LUT value necessary for the interpolation calculation used in the embodiment. FIG. 35 is a diagram showing an outline of the selection and extraction command.

The selection and extraction command is a command for extracting, with a selection and extraction pattern value acquired by the index-value acquiring unit 105 as an index value, a value from a register in which LUT values are stored by the color-conversion-value storing unit 106 (a so-called shuffle command).

By adding this step to a part of the interpolation calculation flow (see FIG. 22) in the first embodiment, it is possible to perform high-speed interpolation calculation even when a look up table with a large data size is used.

Figure 36:
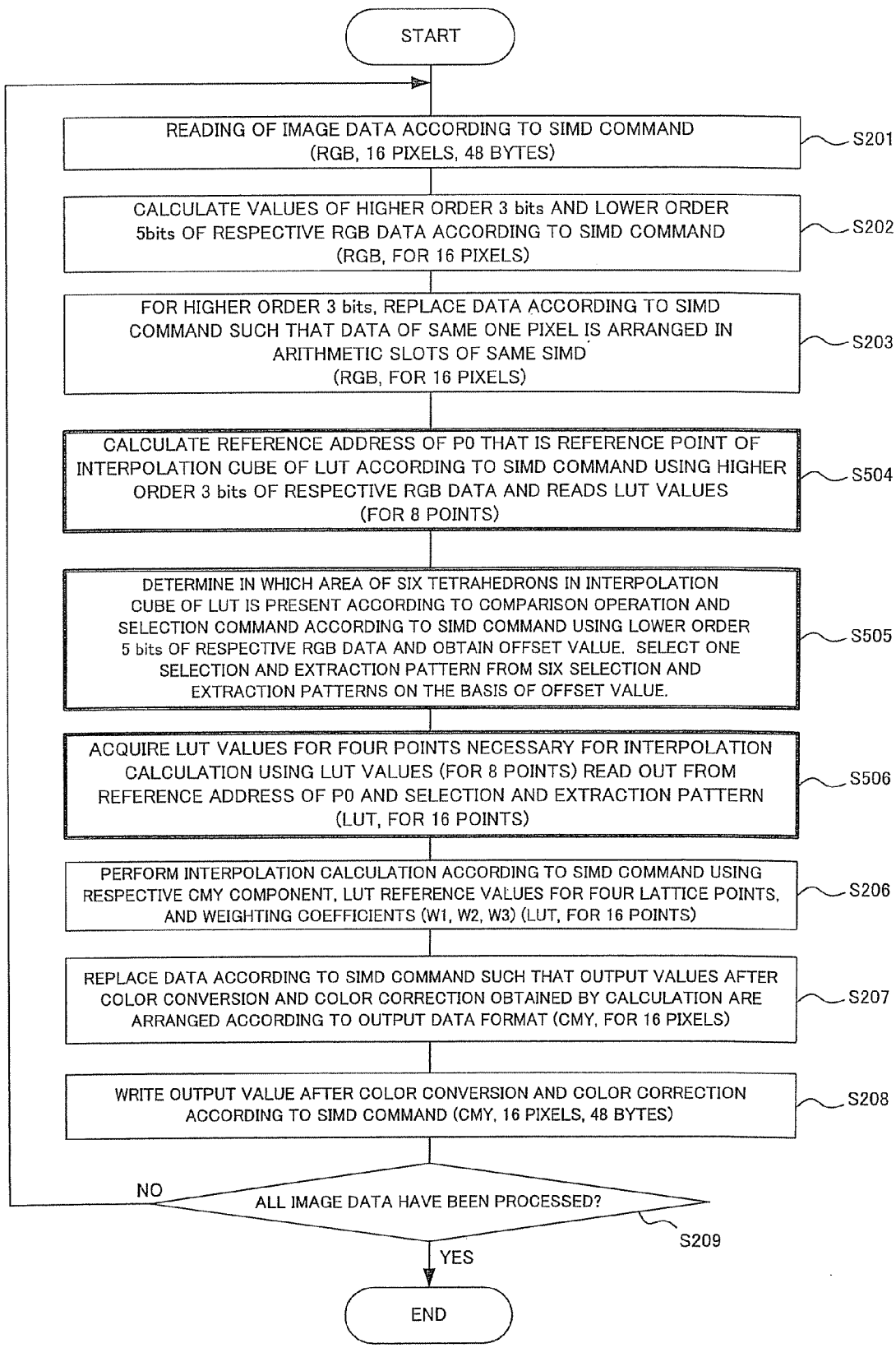
FIG. 36 is a flowchart showing a flow of color conversion processing in the color conversion apparatus according to the embodiment.

FIG. 36 is a flowchart showing a flow of color conversion processing in the color conversion apparatus according to this embodiment. In FIG. 36, steps in thick frames (S504 to S506) are steps different from the processing in FIG. 22 in the first embodiment.

After performing the replacement of data in the register according to the SIMD command (S203), the color-value acquiring unit 101 calculates, using a higher order 3 bits of respective RGB values, a reference address in the MEMORY 802 of "P0", which is a reference point of a cubic lattice in the LUT, according to the SIMD command and reads LUT values for eight points (S504).

The index-value acquiring unit 105 discriminates, using a lower order 5 bits of the respective RGB values, to which area among six kinds of triangular pyramid areas in the cubic lattice in the LUT an input color belongs according to the comparison operation command and the selection command in the SIMD command (a polyhedron discriminating step)

and obtains an offset value. The index-value acquiring unit 105 acquires, from this offset value, an index value indicating a lattice point forming the triangular pyramid area discriminated in the polyhedron discriminating step (an index-value acquiring step) (S505).

The color-conversion-value acquiring unit 106 acquires, on the basis of the index value acquired in the index-value acquiring step, color conversion values associated with respective plural lattice points forming the triangular pyramid area (a color-conversion-value acquiring step) (S506). In the color-conversion-value acquiring step, the color-conversion-value acquiring unit 106 allocates, on the basis of the index value acquired in the index-value acquiring step, the color conversion values associated with the respective plural lattice points forming the polyhedron to the registers according to the shuffle command.

With such a constitution, it is possible to realize the color conversion processing with small memory usage even when a look up table with a large data size (e.g., 33×33×33) is used to improve interpolation accuracy of the color conversion processing.

In the conventional color-conversion processing method, since the number of times of LUT reference is large, sufficient processing speed is not obtained simply by executing the address calculation and the arithmetic processing portion of the interpolation processing in parallel according to the SIMD command and increasing speed. However, in the first and the second embodiments, it is possible to realize extremely fast color conversion processing by reexamining a structure of the LUT to make it possible to acquire LUT values necessary for the interpolation processing in a minimum number of times of memory reference and combining a method of not using the conditional branch command in an area determination processing.

In the respective embodiments, for convenience of explanation, an input value (an input color space) as an object of the color conversion processing is a three-dimensional value and an output value (an output color space) may be any dimensional value. However, the invention is not limited to this. For example, it is also possible to set colors represented by one-dimensional, two-dimensional, and four or higher dimensional color spaces as an object of the color conversion processing (an input color).

The respective steps in the processing in the color conversion apparatus are realized by causing the CPU 801 to execute the color conversion program stored in the MEMORY 802.

Third Embodiment

A third embodiment of the invention will be explained.

A filter processing apparatus according to this embodiment has a function of applying predetermined space filter processing to image data that is input data.

Figure 37:
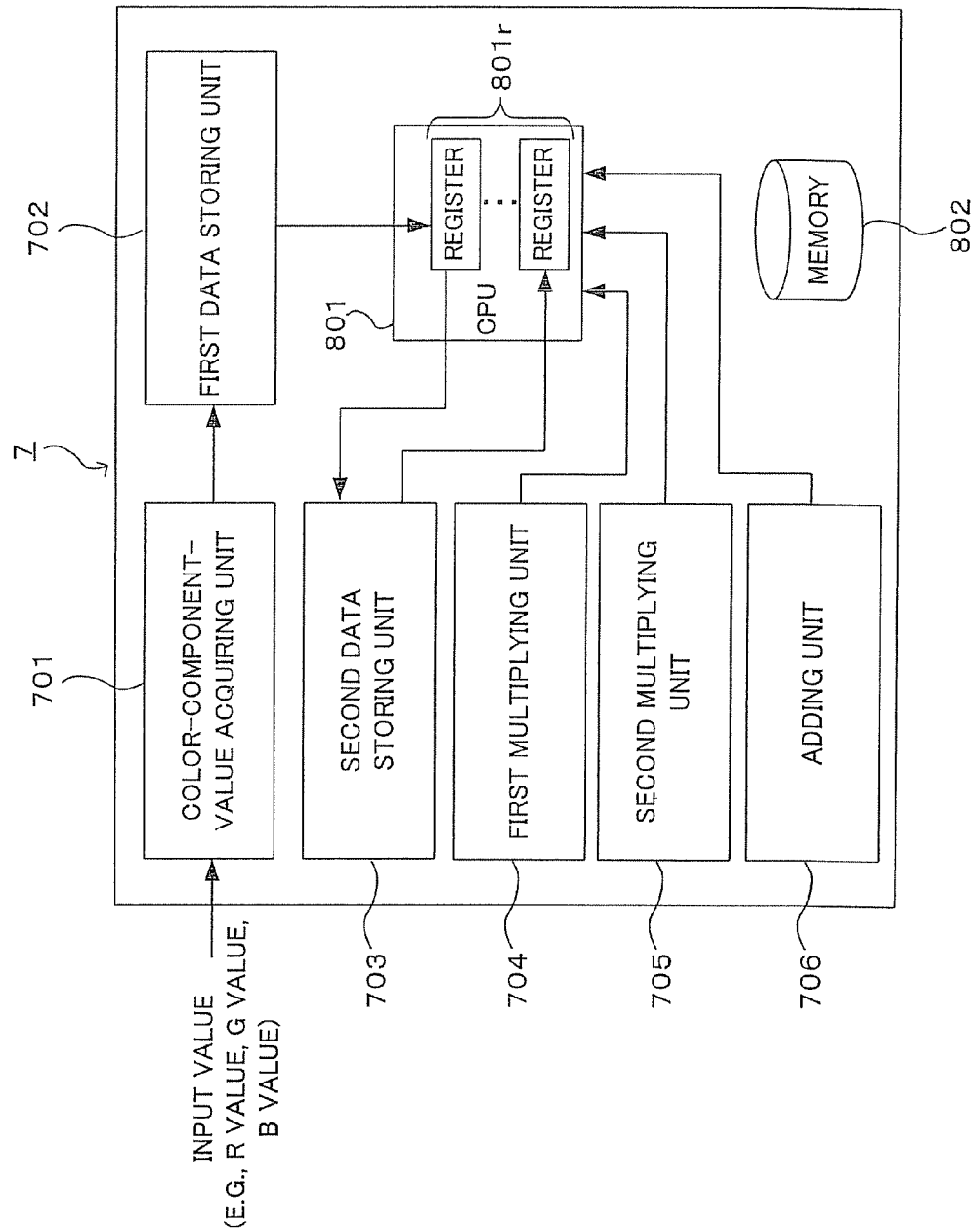
FIG. 37 is a functional block diagram showing a structure of a filter processing apparatus according to a third embodiment of the invention.

FIG. 37 is a functional block diagram showing a structure of a filter processing apparatus according to the third embodiment of the invention.

A filter processing apparatus 7 according to this embodiment includes a color-component-value acquiring unit 701, a first data storing unit 702, a second data storing unit 703, a first multiplying unit 704, a second multiplying unit 705, an adding unit 706, the CPU 801, and the MEMORY 802.

The color-component-value acquiring unit 701 acquires color component values of respective pixels forming image data as a processing object.

The first data storing unit 702 causes a first register to store color component values for plural colors acquired by the color-component-value acquiring unit while keeping a data array of an order same as that of a data array at the time when the color component values are acquired by the color-component-value acquiring unit.

The second data storing unit 703 causes a second register to store the color component values for the plural colors acquired by the color-component-value acquiring unit in a state in which the color component values are shifted by a predetermined number of bits with respect to the color component values stored in the first register. Specifically, the second data storing unit 703 causes the second register to store image data shifted in a predetermined direction by the number of color components for one pixel or the number of bits integer times as large as the number of color components with respect to the image data stored in the first register by the first data storing unit 702.

The first multiplying unit 704 multiplies the respective color component values stored in the first register by a first filter coefficient according to the SIMD command.

The second multiplying unit 705 multiplies the respective color component values stored in the second register by a second filter coefficient different from the first filter coefficient according to the SIMD command.

The adding unit 706 adds up calculation results by the first and the second multiplying units according to the SIMD command.

The CPU 801 has a role of performing various kinds of processing in the color conversion apparatus and also has a role of realizing various functions by executing programs stored in the MEMORY 802. The CPU 801 is capable of executing the SIMD command and includes the plural registers 801r used in executing the SIMD command and the like.

The MEMORY 802 is constituted by, for example, a ROM or a RAM and has a role of storing various kinds of information and programs used in the color conversion apparatus.

Conventionally, space filter processing is performed as pre-processing of various image processing such as noise removal, edge enhancement, and halftone dot removal of the image data read from the scanner or the like.

Figures 38, 39, 40:
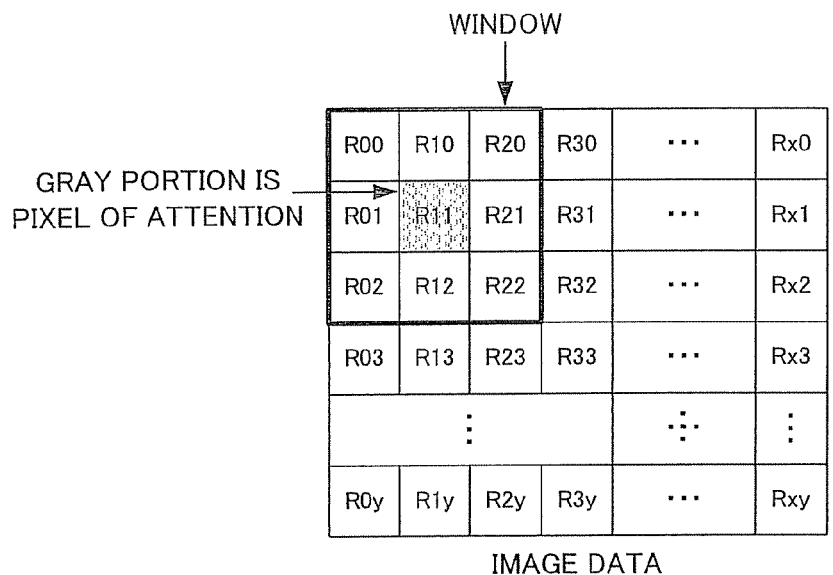
FIG. 38 is a diagram for explaining general two-dimensional space filter processing.
FIG. 39 is a diagram for explaining the general two-dimensional space filter processing.
FIG. 40 is a diagram for explaining the general two-dimensional space filter processing.

FIGS. 38 to 40 are diagrams for explaining general two-dimensional space filter processing. FIG. 38 is a diagram showing 3×3 filter coefficients. FIG. 39 is a diagram showing an example of a relation between image data and a window. FIG. 40 is a diagram showing an example of an equation used in the filter processing.

In FIG. 39, a pixel area surrounded by a 3×3 thick frame on the image data is one processing unit and is called "window". A gray pixel portion in the center of the window is called a "pixel of attention". A result of the filter processing is stored in this pixel of attention. A filter processing result of a value of the pixel in the window center that is the pixel of attention is calculated by arithmetic processing based on a pixel value near the pixel of attention and a filter coefficient. For example, when LPF (Low Pass Filter) processing or HPF (High Pass Filter) processing is performed as the filter processing, an arithmetic operation for multiplying respective pixel values by filter coefficients corresponding thereto, calculating a sum of the pixel values multiplied by the filter coefficients, and dividing a value of the sum by a constant is performed (see FIG. 40). The filter processing is performed by applying the calculation of a pixel of attention to the entire image data while sifting this window pixel by pixel.

However, since an arithmetic operation amount of the space filter processing is large, when a size of the window used in the filter processing increases (the number pixels included in the window increases), processing time of the filter processing tends to be extremely long. To cope with this problem, as a method of processing an arithmetic operation of the space filter processing at high speed with software, an arithmetic operation method employing a so-called "SIMD-type processor" capable of executing an SIMD (Single Instruction Multiple Data) command is known.

Since the SIMD-type processor can execute same arithmetic processing on plural data in parallel, the SIMD-type processor is suitable when the same arithmetic processing such as image processing is executed on plural pixels.

Figure 41:
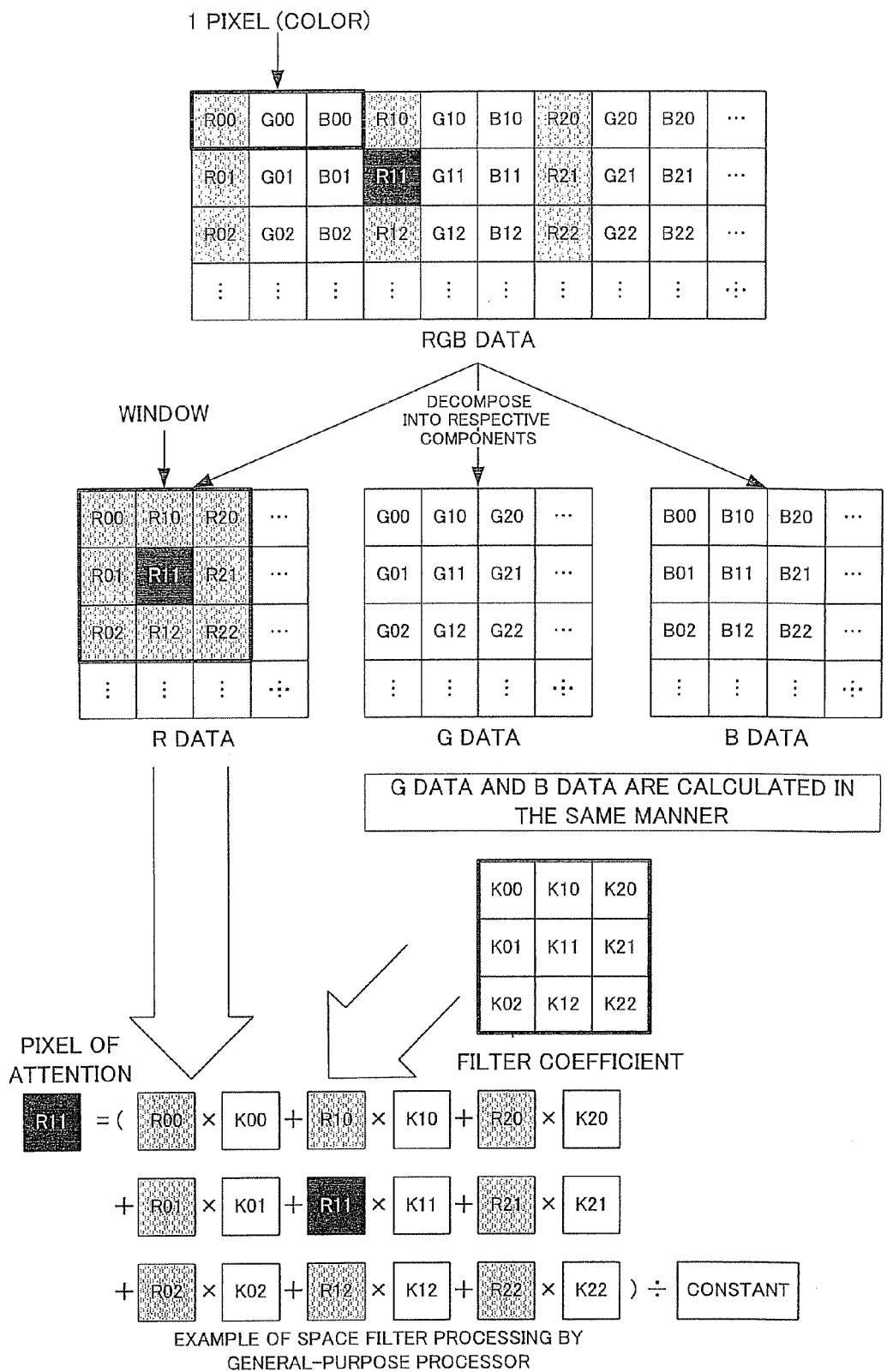
FIG. 41 is a diagram showing an example of space filter processing by a general-purpose processor.
Figure 42:
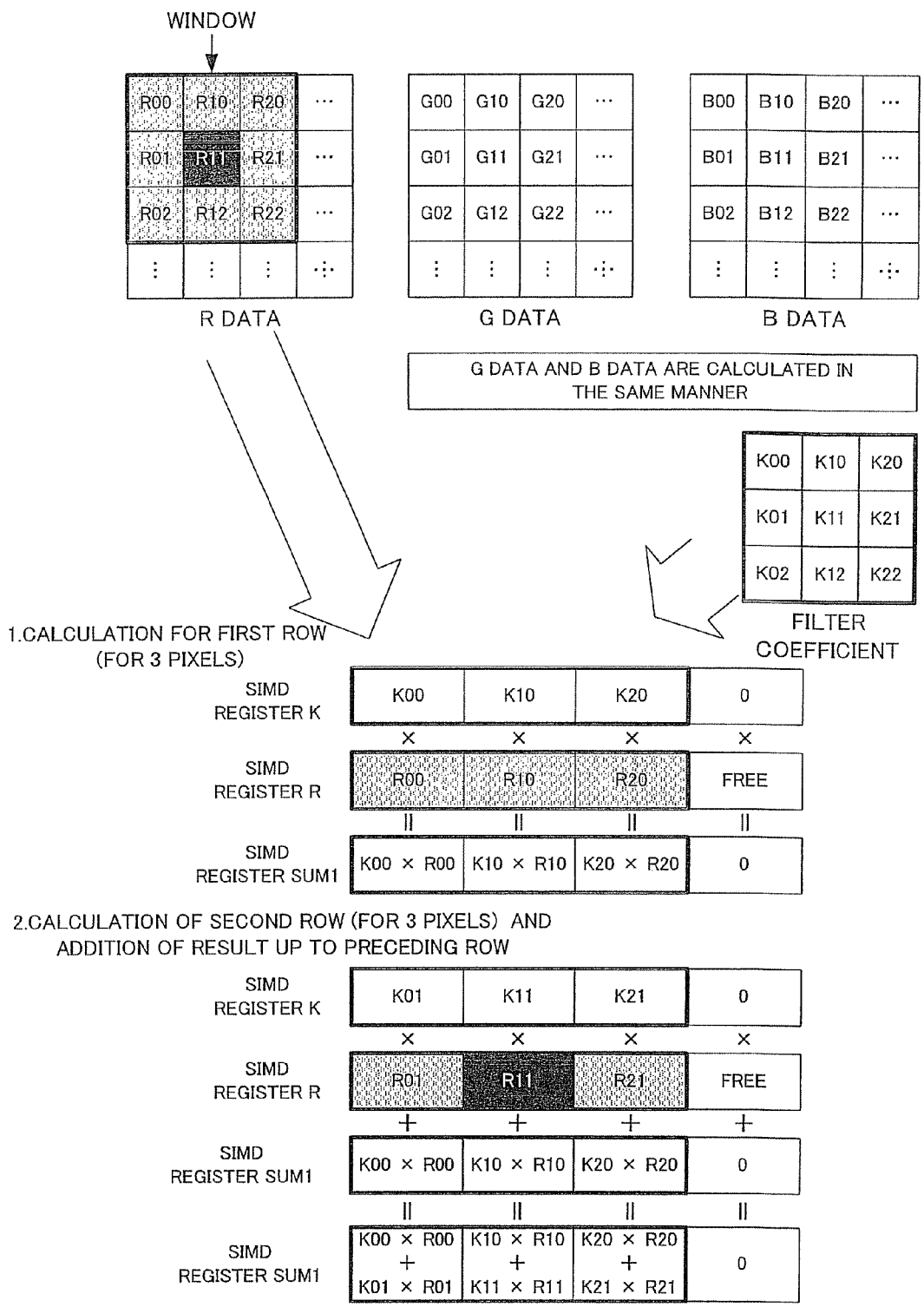
FIG. 42 is a diagram showing an example of space filter processing by an SIMD processor.

When a sum of product operation in the filter processing is performed by the conventional general-purpose processor, the equation (see FIG. 40) for decomposing image data for respective color components (an R component, a G component, and a B component), multiplying the pixel data by a predetermined filter coefficient corresponding thereto, and adding up the image data multiplied by the filter coefficient as shown in FIG. 41 is described as a program as it is.

Even when the SIMD-type processor is used, as shown in FIGS. 42 to 46, after decomposing image data for respective color components, the image data is allocated to respective arithmetic slots by a unit of window and processing same as the calculation performed in the general-purpose processor is executed in parallel to realize an increase in speed of the processing.

In general, a window size used for filter processing of image data is often an "odd number×odd number" size such as "3×3" or "7×7" because a pixel in the center of the window is set as a pixel of attention. On the other hand, since the number of arithmetic slots of the SIMD-type processor is generally the "power of two", an unused free arithmetic slot is formed as shown in FIGS. 42 to 46, which makes the processing inefficient.

Thus, in the filter processing apparatus 7 according to this embodiment, the free arithmetic slot shown in FIGS. 42 to 46 is not formed in the SIMD-type processor, all the arithmetic slots are efficiently used, and the step of decomposing image data for respective three color components is omitted to increase speed of the filter processing.

Figure 47:
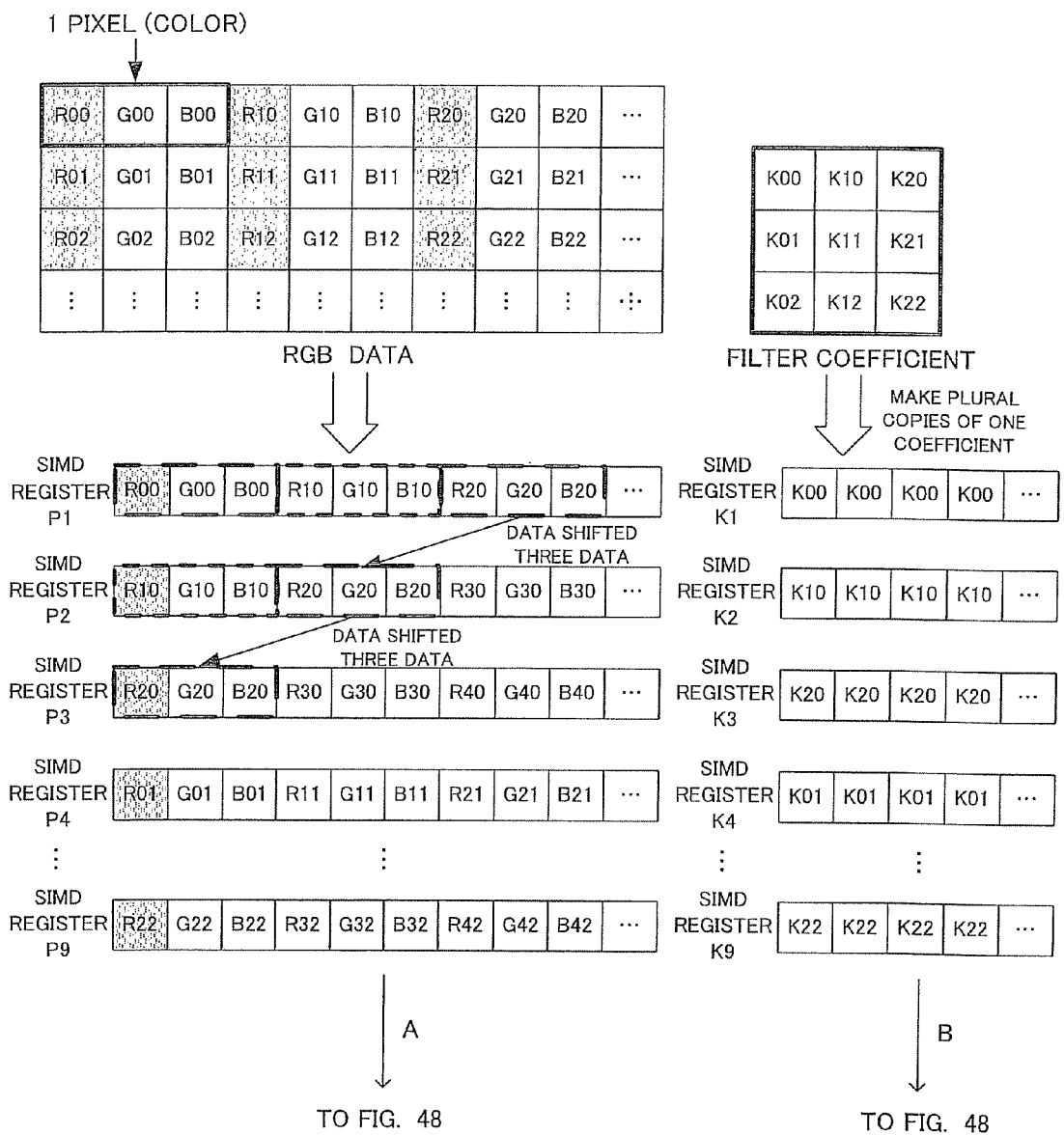
FIG. 47 is a diagram for explaining an outline of filter processing in the embodiment.
Figure 48:
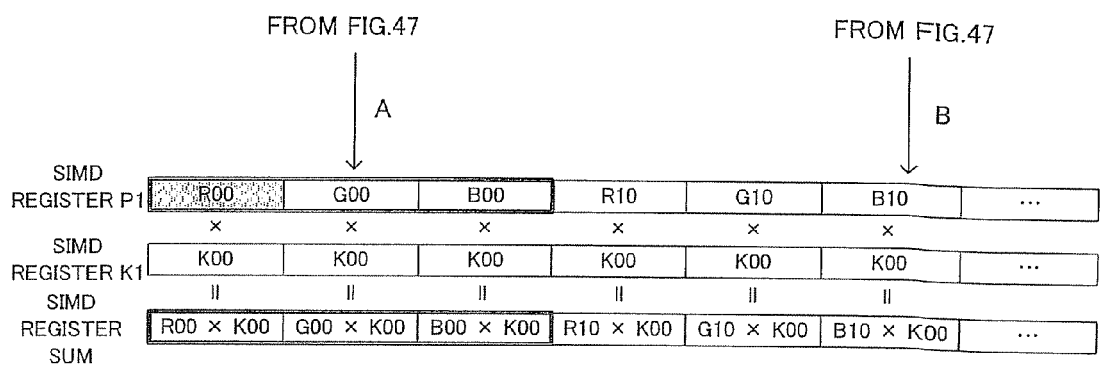
FIG. 48 is a diagram for explaining the outline of the filter processing in the embodiment.

FIGS. 47 to 53 are diagrams for explaining an outline of the filter processing in this embodiment. RGB data and filter coefficients in an upper part of FIG. 47 are the same as those shown in FIG. 41.

First, the color-component-value acquiring unit 701 causes an SIMD register to read the RGB data that is an input value (see FIG. 47). Explaining with a 3×3 filter as an example, when a position of a pixel of attention is R11/G11/B11, the first data storing unit 702 causes a register P1, which is one of the plural registers 801r, to store the RGB data for a register length (16 bytes) from R00/G00/B00 that is a staring address of a first line. It is assumed that respective registers (SIMD registers P1 to P9, SIMD registers K1 to K9, an SIMD registers SUM, and an SIMD register DIV) used in the filter processing in this embodiment are registers included in the plural registers 801r.

The second data storing unit 703 causes the register P2 to store data shifted by one pixel (3 bytes) from the register P1 and causes the register P3 to store data shifted by two pixels (6 bytes) from the register P1 in the same manner. Since there is limitation on an accessible data boundary (an SIMD register length unit), data reading from a memory area (e.g., the MEMORY 802) in the SIMD register and data writing in the memory area from the SIMD register are realized by, after reading data of a necessary area in plural work registers, copying data necessary in a data replacement command or the like to the register and causing the register to store the data.

Similarly, the second data storing unit 703 causes the register P4 to store the RGB data with R01/G01/B01, which is a second line, as a starting address, causes the register P5 to store data shifted by one pixel (3 bytes) from the register P4, and causes the register P6 to store data shifted by two pixels (6 bytes) from the register P4. For a third line, the second data storing unit 703 causes the register P7 to store the RGB data with R02/G02/B02 as a starting address and causes the register P8 and the register P9 to store data in the same manner.

Concerning the filter coefficient, as shown in FIG. 47, the second data storing unit 703 copies an identical coefficient to a position corresponding to an arithmetic slot of each of the SIMD registers. The second data storing unit 703 applies this processing to all nine coefficients for the registers K1 to K9.

Subsequently, the second data storing unit 703 performs multiplication for the respective arithmetic slots of the SIMD registers P1 and K1 and causes an SIMD register SUM to store a result of the arithmetic operation. In this case, the number of arithmetic slots that can be calculated in parallel varies depending on a range of numerical values treated. In the figure, for convenience of explanation, six or more arithmetic slots can be calculated in one register. However, the number may be four depending on a range of numerical values treated. In that case, since the RGB data is divided to and held in plural registers P1-1 and P1-2 equivalent to the SIMD register P1 and the coefficient of the SIMD register K1 takes a form corresponding to the divided P1-1 and P1-2, the processing applied to the SIMD registers P1 and K1 according to one time of multiplication command is performed according to plural times of multiplication commands. However, this means that the data is simply processed dividedly. There is no change in the basic idea that data of respective pixels are multiplied by the same one filter coefficient. This holds true for processing described later.

Figure 49:
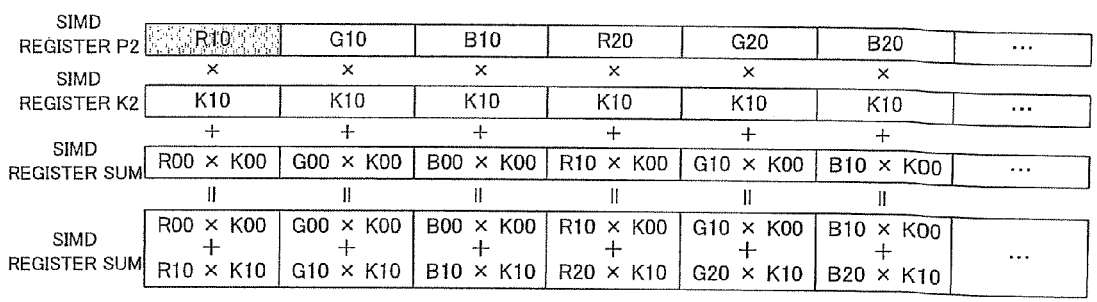
FIG. 49 is a diagram for explaining the outline of the filter processing in the embodiment.

The first multiplying unit 704 and the second multiplying unit 705 apply multiplication processing to the respective arithmetic slots of the SIMD registers P2 and K2 (see FIG. 49). The adding unit 706 adds a result of the multiplication processing to the SIMD register SUM obtained by calculation earlier and causes the SIMD register SUM to store the result (see FIG. 49). The same processing is applied to the SIMD registers P3 to P9 and K3 to K9 as shown in FIGS. 50 to 52.

According to the processing performed to this point, a sum of a calculation result obtained by multiplying nine pixels in the window by nine coefficients is calculated in the respective arithmetic slots of the SIMD registers. In the respective arithmetic slots of the SIMD registers, data of plural windows are subjected to parallel processing. If a sum of the parallel processing is multiplied by an inverse of a constant as shown in FIG. 53, filter processing results of plural pixels of attention are simultaneously obtained.

Figure 55:
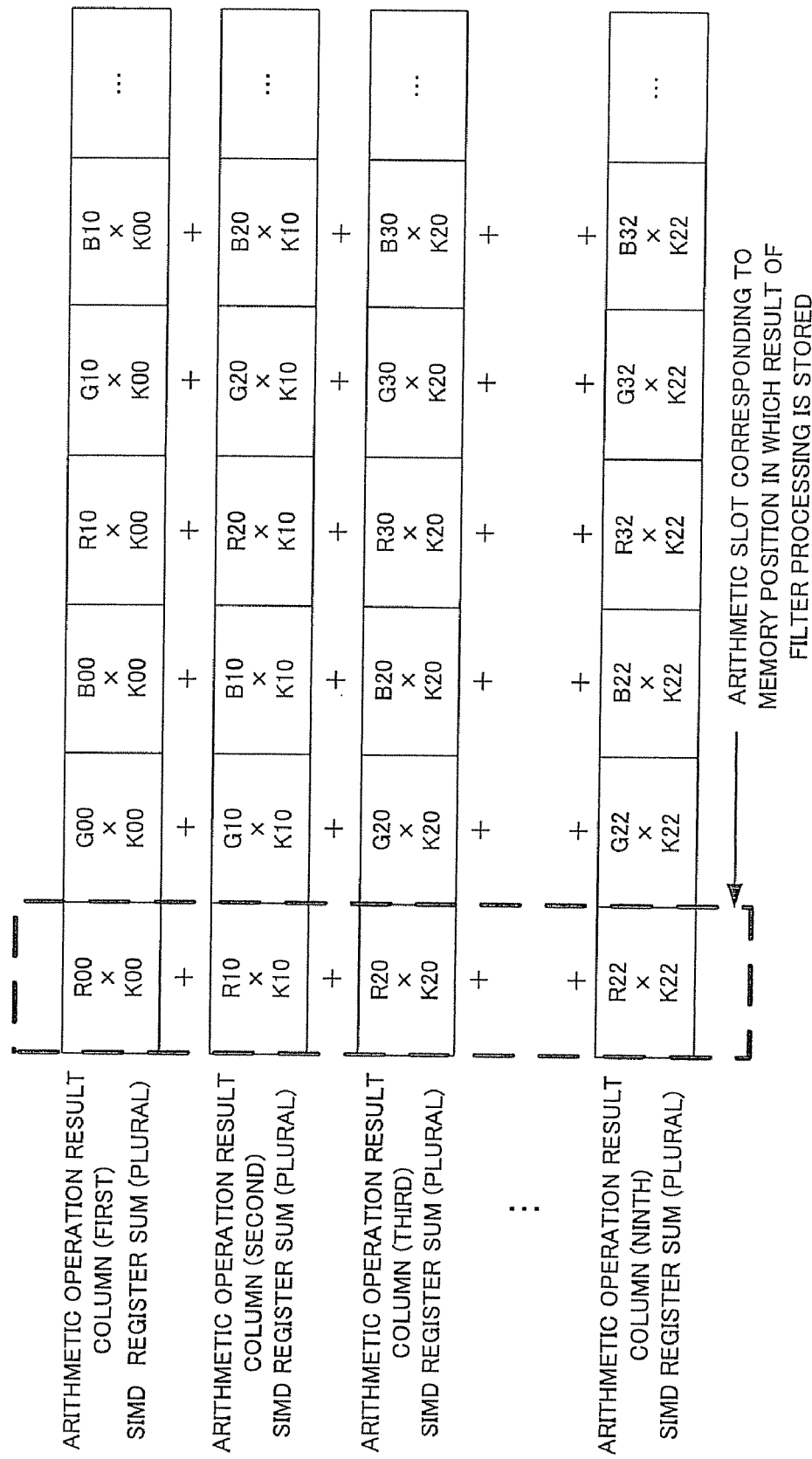
FIG. 55 is a diagram showing a state in which data as an arithmetic operation object is arranged in arithmetic slots corresponding to memory positions in which a result of the arithmetic operation is stored.

By performing the processing described above, a data array of an arithmetic operation result obtained is the same as a data array of original image data. It is unnecessary to perform useless data replacement processing in storing a result of filter processing. Consequently, it is possible to realize improvement of processing efficiency of the filter processing and an increase in speed of processing. This is realized by arranging data as an arithmetic operation object in the filter processing in arithmetic slots corresponding to memory positions in which a result of the filter processing is stored as shown in FIG. 55.

As described above, according to this embodiment, it is possible to realize an increase in speed of the filter processing by adopting the arithmetic operation method of multiplying plural pixels by one filter coefficient and calculating a sum of products of the multiplication such that image data, which is original input data, can be used in an arithmetic operation without changing a data array at the time of input, omitting the useless data replacement processing in the arithmetic and writing processing from data reading, and improving a usage rate of arithmetic slots.

Figure 56:
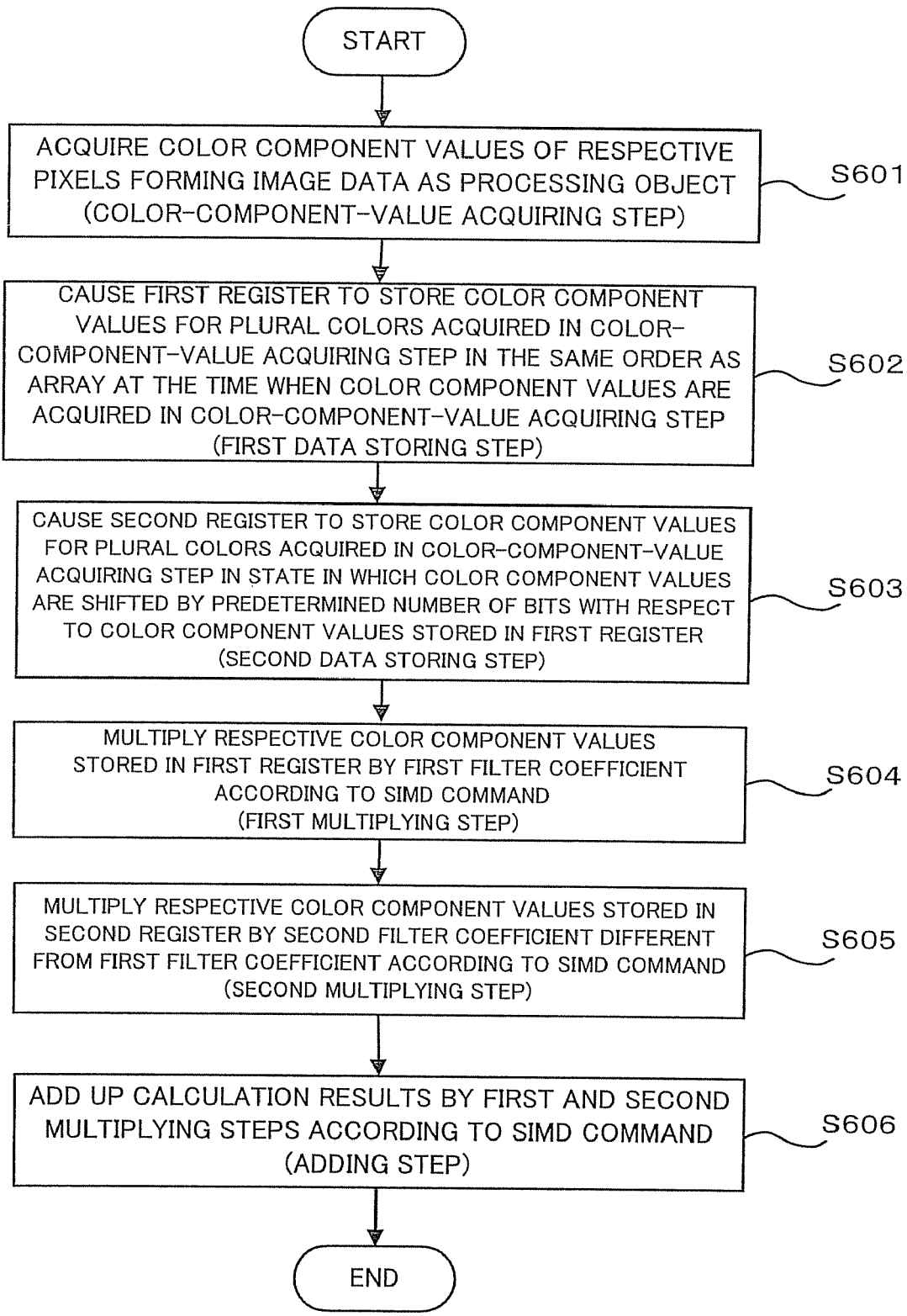
FIG. 56 is a flowchart for explaining a flow of rough processing (a filter processing method) in the filter processing apparatus according to the embodiment.

FIG. 56 is a flowchart for explaining a flow of rough processing (a filter processing method) in the filter processing apparatus according to this embodiment.

The color-component-value acquiring unit 701 acquires color component values of respective pixels forming image data as a processing object (a color-component-value acquiring step) (S601).

The first data storing unit 702 causes the first register to store color component values for plural colors acquired in the color-component-value acquiring step in the same order as an array at the time when the color component values are acquired in the color-component-value acquiring step (a first data storing step) (S602).

The second data storing unit 703 causes the second register to store color component values for the plural colors acquired in the color-component-value acquiring step in a state in which the color component values are shifted by a predetermined number of bits with respect to the color component values stored in the first register (in a state in which the color component values are shifted a predetermined direction by the number of color components for one pixel or the number of bits integer times as large as the number of color components with respect to the image data stored in the first register by the first data storing step) (a second data storing step) (S603).

The first multiplying unit 704 multiplies the respective color component values stored in the first register by the first filter coefficient according to the SIMD command (a first multiplying step) (S604).

The second multiplying unit 705 multiplies the respective color component values stored in the second register by the second filter coefficient different from the first filter coefficient according to the SIMD command (a second multiplying step) (S605).

The adding unit 706 adds up calculation results by the first and the second multiplying steps according to the SIMD command (an adding step) (S606).

The respective steps in the processing in the filter processing apparatus are realized by causing the CPU 801 to execute a filter processing program stored in the MEMORY 802.

In this embodiment, the functions for carrying out the invention are recorded in the apparatus in advance. However, the invention is not limited to this. The same functions may be downloaded from a network to the apparatus or the same functions stored in a recording medium may be installed in the apparatus. As the recording medium, a form of the recording medium may be any form as long as the recording medium is a recording medium that can store programs and is readable by the apparatus such as a CD-ROM. The functions obtained by installation or download in advance in this way may be realized in cooperation with an OS (Operating System) or the like in the apparatus.

The invention has been explained in detail according to the specific forms. However, it would be obvious for those skilled in the art that various alterations and modifications can be made without departing from the spirit and the scope of the invention.

As described in detail above, according to the invention, it is possible to provide a technique that can contribute to improvement of processing efficiency in performing image processing employing a processor that is capable of executing an SIMD command.

What is claimed is:

1. A color conversion apparatus that converts, on the basis of a three-dimensional look up table that stores color conversion values associated with respective plural lattice points dividing a first color space represented by three kinds of color components into plural cubic lattices, a color value of a point belonging to the first color space into a color value of a point belonging to a second color space, the color conversion apparatus comprising:

a color-value acquiring unit configured to acquire a color value of a point belonging to the first color space as an object of color conversion;

a lattice discriminating unit configured to discriminate, on the basis of the color value acquired by the color-value acquiring unit, a cubic lattice on the first color space to which the point as an object of color conversion belongs;

a polyhedron discriminating unit configured to discriminate, by performing comparison of the color value acquired by the color-value acquiring unit and a color value of a lattice point included in the cubic lattice discriminated by the lattice discriminating unit, to which one of plural polyhedrons the point as an object of color conversion belongs, the polyhedrons being obtained by dividing the cubic lattice, which is discriminated by the lattice discriminating unit, with a plane having plural lattice points included in the cubic lattice as vertices; and an interpolation operation unit configured to interpolate, on the basis of color conversion values associated with lattice points forming the polyhedron discriminated by the polyhedron discriminating unit, a color value of a point belonging to the second color space that corresponds to the color value of the point belonging to the first color space.

2. A color conversion apparatus according to claim 1, wherein the polyhedron discriminating unit discriminates to which one of plural polyhedrons obtained by dividing the cubic lattice, which is discriminated by the lattice discriminating unit, with a plane having plural lattice points included in the cubic lattice as vertices the point as an object of color conversion belongs by comparing the color value acquired by the color-value acquiring unit and a color value of a lattice point included in the cubic lattice discriminated by the lattice discriminating unit according to a comparison operation command in an SIMD (Single Instruction Multiple Data) command, and the interpolation operation unit acquires a color conversion value associated with a lattice point forming the polyhedron discriminated by the polyhedron discriminating unit according to a selection command in the SIMD command.

3. A color conversion apparatus according to claim 2, wherein the polyhedron discriminating unit compares, without using a conditional branch command, the color value acquired by the color-value acquiring unit and a color value of a lattice point included in the cubic lattice discriminated by the lattice discriminating unit according to the comparison operation command in the SIMD command and acquires, on the basis of a result of the comparison operation, a polyhedron identification number indicating a polyhedron to which the point as an object of color conversion belongs among the plural polyhedrons obtained by dividing the cubic lattice by the plane having plural lattice points included in the cubic lattice discriminated by the lattice discriminating unit as vertices according to a selection operation command in the SIMD command, and the interpolation operation unit acquires, on the basis of the polyhedron identification number acquired by the polyhedron discriminating unit, a storage address of a color conversion value associated with the polyhedron corresponding to the polyhedron identification number according to an arithmetic operation and acquires a color conversion value stored in the storage address in a predetermined memory area.

4. A color conversion apparatus according to claim 3, wherein the polyhedron identification number is set to a multiple of a basic unit size forming the three-dimensional look up table.

5. A color conversion apparatus according to claim 1, wherein the plural color conversion values associated with the respective plural lattice points included in the polyhedron in the three-dimensional look up table are stored in a memory area such that storage addresses thereof are adjacent to one another.

6. A color conversion apparatus according to claim 5, wherein the plural color conversion values associated with the plural polyhedrons obtained by dividing the cubic lattice are stored such that intervals among starting addresses of a memory area in which the plural color conversion values are stored, respectively, are predetermined intervals.

7. A color conversion apparatus according to claim 5, wherein the color conversion values stored in the memory area are arrayed by a unit of register length of the (Single Instruction Multiple Data) SIMD command and stored.

8. A color conversion apparatus according to claim 2, comprising:
an index-value acquiring unit configured to acquire an index value indicating a lattice point forming the polyhedron discriminated by the polyhedron discriminating unit; and
a color-conversion-value acquiring unit configured to acquire, on the basis of the index value acquired by the index-value acquiring unit, color conversion values associated with respective plural lattice points forming the polyhedron.

9. A color conversion apparatus according to claim 8, wherein the color-conversion-value acquiring unit allocates, on the basis of the index value acquired by the index-value acquiring unit, the color conversion values associated with the respective plural lattice points forming the polyhedron to registers according to a shuffle command.

10. A filter processing apparatus that applies space filter processing to image data, comprising
a color-component-value acquiring unit configured to acquire color component values of respective pixels forming image data as a processing object;
a first data storing unit configured to store color component values acquired by the color-component-value acquiring unit in a first register in an order same as an array of the color component values at the time when the color component values are acquired by the color-component-value acquiring unit;
a second data storing unit configured to store color component values acquired by the color-component-value acquiring unit in a second register in a state in which the color component values are shifted by a predetermined number of bits with respect to the color component values stored in the first register;
a first multiplying unit configured to multiply the respective color component values stored in the first register by a first filter coefficient according to an SIMD (Single Instruction Multiple Data) command;
a second multiplying unit configured to multiply the respective color component values stored in the second register by a second filter coefficient different from the first filter coefficient according to the SIMD command; and
an adding unit configured to add up results of the calculation by the first and the second multiplying units according to the SIMD command.

11. A filter processing apparatus according to claim 10, wherein the first and the second data storing units cause the first and the second registers to store color component values for plural colors.

12. A filter processing apparatus according to claim 10, wherein the second data storing unit causes a second register to store image data shifted in a predetermined direction by a number of color components for one pixel or a number of bits integer times as large as the number of color components with respect to the image data stored in the first register by the first data storing unit.

13. A color conversion method of converting, on the basis of a three-dimensional look up table that stores color conversion values associated with respective plural lattice points dividing a first color space represented by three kinds of color components into plural cubic lattices, a color value of a point belonging to the first color space into a color value of a point belonging to a second color space, the color conversion method comprising:
using a processor to execute:
a color-value acquiring step of acquiring a color value of a point belonging to the first color space as an object of color conversion;
a lattice discriminating step of discriminating, on the basis of the color value acquired in the color-value acquiring step, a cubic lattice on the first color space to which the point as an object of color conversion belongs;
a polyhedron discriminating step of discriminating, by performing comparison of the color value acquired in the color-value acquiring step and a color value of a lattice point included in the cubic lattice discriminated in the lattice discriminating step, to which one of plural polyhedrons the point as an object of color conversion belongs, the polyhedrons being obtained by dividing the cubic lattice, which is discriminated in the lattice discriminating step, with a plane having plural lattice points included in the cubic lattice as vertices; and
an interpolation operation step of interpolating, on the basis of color conversion values associated with lattice points forming the polyhedron discriminated in the polyhedron discriminating step, a color value of a point belonging to the second color space that corresponds to the color value of the point belonging to the first color space.

14. A color conversion method according to claim 13, wherein
in the polyhedron discriminating step, it is discriminated to which one of plural polyhedrons obtained by dividing the cubic lattice, which is discriminated in the lattice discriminating step, with a plane having plural lattice points included in the cubic lattice as vertices the point as an object of color conversion belongs by comparing the color value acquired in the color-value acquiring step and a color value of a lattice point included in the cubic lattice discriminated in the lattice discriminating step according to a comparison operation command in an SIMD (Single Instruction Multiple Data) command, and in the interpolation operation step, a color conversion value associated with a lattice point forming the polyhedron discriminated in the polyhedron discriminating step is acquired according to a selection command in the SIMD command.

15. A color conversion method according to claim 14, wherein in the polyhedron discriminating step, the color value acquired in the color-value acquiring step and a color value of a lattice point included in the cubic lattice discriminated in the lattice discriminating step are compared without using a conditional branch command according to the comparison operation command in the SIMD command and, on the basis of a result of the comparison operation, a polyhedron identification number indicating a polyhedron to which the point as an object of color conversion belongs among the plural polyhedrons obtained by dividing the cubic lattice by the plane having plural lattice points included in the cubic lattice discriminated in the lattice discriminating step as vertices is acquired according to a selection operation command in the SIMD command, and in the interpolation operation step, on the basis of the polyhedron identification number acquired in the polyhedron discriminating step, a storage address of a color conversion value associated with the polyhedron corresponding to the polyhedron identification number is acquired according to an arithmetic operation and a color conversion value stored in the storage address in a predetermined memory area is acquired.

16. A color conversion method according to claim 15, wherein the polyhedron identification number is set to a multiple of a basic unit size forming the three-dimensional look up table.

17. A color conversion method according to claim 13, wherein the plural color conversion values associated with the respective plural lattice points included in the polyhedron in the three-dimensional look up table are stored in a memory area such that storage addresses thereof are adjacent to one another.

18. A color conversion method according to claim 17, wherein the plural color conversion value associated with the plural polyhedrons obtained by dividing the cubic lattice are stored such that intervals among starting addresses of a memory area in which the plural color conversion values are stored, respectively, are predetermined intervals.

19. A color conversion method according to claim 14, comprising:

an index-value acquiring step of acquiring an index value indicating a lattice point forming the polyhedron discriminated in the polyhedron discriminating step; and a color-conversion-value acquiring step of acquiring, on the basis of the index value acquired in the index-value acquiring step, color conversion values associated with respective plural lattice points forming the polyhedron.

20. A color conversion method according to claim 19, wherein, in the color-conversion-value acquiring step, on the basis of the index value acquired in the index-value acquiring step, the color conversion values associated with the respective plural lattice points forming the polyhedron are allocated to registers according to a shuffle command.

* * * * *